(12) United States Patent
Minaki et al.

(10) Patent No.: US 10,131,377 B2
(45) Date of Patent: Nov. 20, 2018

(54) ELECTRIC POWER STEERING APPARATUS

(71) Applicant: NSK LTD., Tokyo (JP)

(72) Inventors: Ryo Minaki, Tokyo (JP); Takayoshi Sugawara, Tokyo (JP); Hideki Sawada, Tokyo (JP)

(73) Assignee: NSK LTD., Shinagawa-ku, Tokyo (JP)

( * ) Notice: Subject to any disclaimer, the term of this patent is extended or adjusted under 35 U.S.C. 154(b) by 0 days.

(21) Appl. No.: 15/516,145

(22) PCT Filed: Nov. 30, 2015

(86) PCT No.: PCT/JP2015/083617
§ 371 (c)(1),
(2) Date: Mar. 31, 2017

(87) PCT Pub. No.: WO2016/088718
PCT Pub. Date: Jun. 9, 2016

(65) Prior Publication Data
US 2017/0297614 A1    Oct. 19, 2017

(30) Foreign Application Priority Data
Dec. 2, 2014    (JP) ................. 2014-244331

(51) Int. Cl.
*B62D 6/08*    (2006.01)
*B62D 6/04*    (2006.01)
(Continued)

(52) U.S. Cl.
CPC ............ *B62D 5/0463* (2013.01); *B62D 1/28* (2013.01); *B62D 5/0493* (2013.01); *B62D 6/007* (2013.01);
(Continued)

(58) Field of Classification Search
CPC ... B62D 6/00; B62D 6/08; B62D 6/04; B62D 5/0463; B62D 15/021; B62D 5/04; B62D 15/0285; B62D 5/0493; B62D 1/286
See application file for complete search history.

(56) References Cited

U.S. PATENT DOCUMENTS 9,919,733 B2    3/2018    Minaki et al.
2003/0079933 A1    5/2003    Chabaan
(Continued)

FOREIGN PATENT DOCUMENTS

EP    0 900 712 A2    3/1999
EP    1 640 246 A2    3/2006
(Continued)

OTHER PUBLICATIONS

International Search Report of PCT/JP2015/083617, dated Feb. 9, 2016. [PCT/ISA/210].
(Continued)

*Primary Examiner* — Yonel Beaulieu
*Assistant Examiner* — Martin A Weeks
(74) *Attorney, Agent, or Firm* — Sughrue Mion, PLLC

(57) ABSTRACT

An electric power steering apparatus including a torque sensor to detect a steering torque and a motor control unit to control a motor that applies an assist torque to a steering system of a vehicle may include a function to switch a control system of the motor between a torque control system of a torque system to control a motor output torque and a position or speed control system of a steering angle system to control a steering angle of a steering in accordance with a predetermined switching trigger. Each of a steering angle command value and a steering angle speed of the position or speed control system and an assist torque level of the torque control system gradually change sensitive to the steering
(Continued)

torque, when shifting from the torque control system to the position or speed control system.

22 Claims, 21 Drawing Sheets

(51) Int. Cl.
    *B62D 5/04*    (2006.01)
    *B62D 1/28*    (2006.01)
    *B62D 6/00*    (2006.01)
    *B62D 15/02*    (2006.01)

(52) U.S. Cl.
    CPC ............... *B62D 6/04* (2013.01); *B62D 6/08* (2013.01); *B62D 15/025* (2013.01); *B62D 15/027* (2013.01); *B62D 1/286* (2013.01)

(56) References Cited

U.S. PATENT DOCUMENTS

| | | | |
|---|---|---|---|
| 2007/0137921 A1 | 6/2007 | Kasahara | |
| 2010/0324783 A1* | 12/2010 | Nishimura | B62D 5/0463 701/41 |
| 2013/0060414 A1 | 3/2013 | Lee et al. | |
| 2013/0261898 A1 | 10/2013 | Fujita et al. | |
| 2015/0025745 A1* | 1/2015 | Tamura | B62D 5/046 701/41 |
| 2015/0088383 A1 | 3/2015 | Kodato et al. | |
| 2015/0151786 A1 | 6/2015 | Fujii | |
| 2015/0191199 A1 | 7/2015 | Tsubaki et al. | |
| 2015/0210318 A1* | 7/2015 | Takeda | B62D 6/003 701/41 |
| 2015/0274203 A1* | 10/2015 | Takeda | B62D 6/008 701/42 |
| 2015/0274206 A1 | 10/2015 | Takeda | |
| 2015/0353125 A1 | 12/2015 | Tsubaki | |
| 2016/0046287 A1 | 2/2016 | Owen et al. | |
| 2016/0129934 A1 | 5/2016 | Akatsuka et al. | |
| 2016/0362128 A1 | 12/2016 | Sugawara et al. | |
| 2017/0166243 A1 | 6/2017 | Sugawara et al. | |
| 2017/0274928 A1 | 9/2017 | Minaki et al. | |
| 2017/0297614 A1 | 10/2017 | Minaki et al. | |

FOREIGN PATENT DOCUMENTS

| | | |
|---|---|---|
| JP | 08-310417 A | 11/1996 |
| JP | 2004-017881 A | 1/2004 |
| JP | 2008-189058 A | 8/2008 |
| JP | 2009-012656 A | 1/2009 |
| JP | 2009022149 A | 1/2009 |
| JP | 2010-221860 A | 10/2010 |
| JP | 2017-013636 A | 1/2017 |
| JP | 2017-189994 A | 10/2017 |
| WO | 2004/106143 A1 | 12/2004 |
| WO | 2014/162769 A1 | 10/2014 |

OTHER PUBLICATIONS

Written Opinion of PCT/JP2015/083617, dated Feb. 9, 2016. [PCT/ISA/237].

JPO Office Action for Application No. 2016-562440 dated Feb. 7, 2017.

International Search Report for PCT/JP2015/083559 dated Feb. 9, 2016 [PCT/ISA/210].

\* cited by examiner

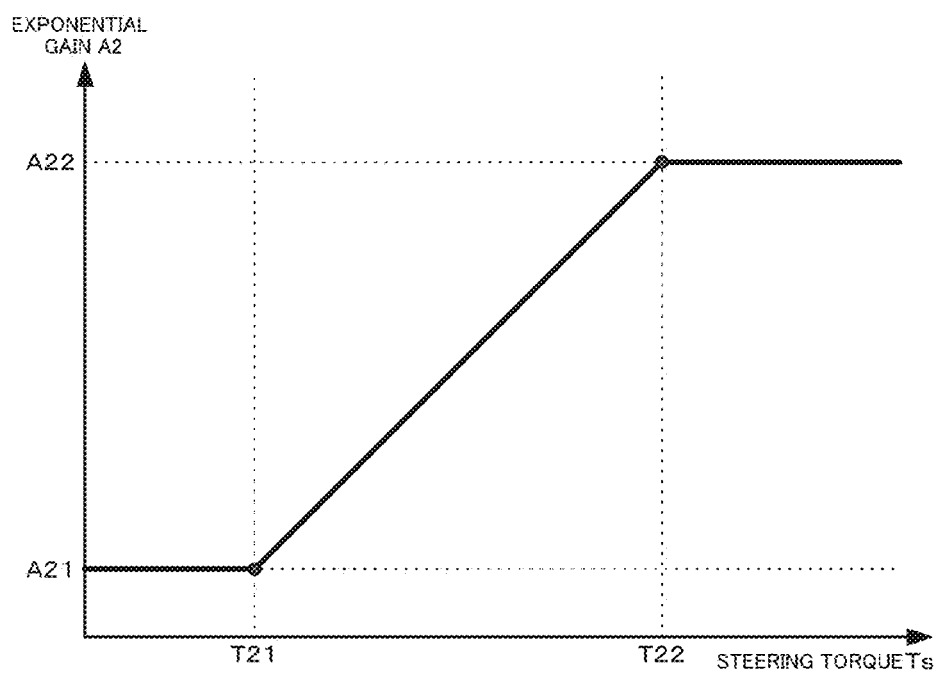

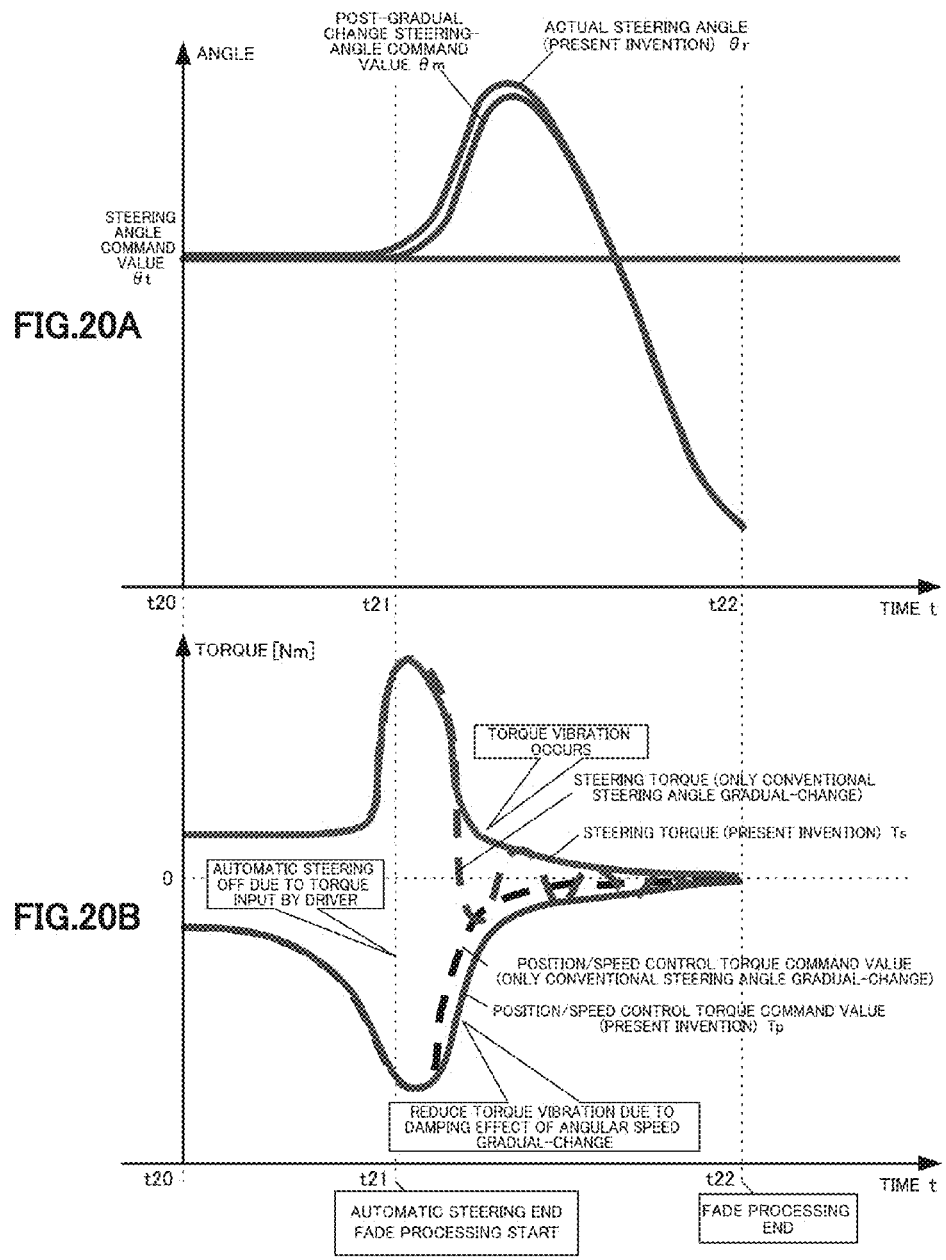

ELECTRIC POWER STEERING APPARATUS

CROSS REFERENCE TO RELATED APPLICATIONS

This application is a National Stage of International Application No. PCT/JP2015/083617 filed Nov. 30, 2015, claiming priority based on Japanese Patent Application No. 2014-244331, filed Dec. 2, 2014, the contents of all of which are incorporated herein by reference in their entirety.

TECHNICAL FIELD

The present invention relates to an electric power steering apparatus that has functions of an automatic steering control (an automatic operation mode, a parking assist mode, etc.) and a manual steering control and applies an assist force to a steering system of a vehicle by a motor, especially to an electric power steering apparatus that has a function to switch a control system of the motor between a torque control system to control a motor output torque and a position/speed control system to control a steering angle of a steering, and can change a fade processing (a gradual changing time and a gain) of a steering angle command value, a steering angle speed and an assist torque level sensitive to a steering torque.

BACKGROUND ART

In an electric power steering apparatus (EPS) which has a motor control unit and applies a steering assist force to a steering system of a vehicle by a rotational force of a motor, the steering assist force is applied to a steering shaft or a rack shaft by a transmission mechanism such as gears and a belt with driving power of the motor via a reducer. Such the conventional electric power steering apparatus performs a feedback control of a motor current in order to precisely generate a torque of steering assist force. The feedback control is to adjust an applied voltage to the motor such that a difference between a steering assist command value (current commanded value) and a detected value of the motor current becomes small. Adjustment of the applied voltage to the motor is generally performed by adjusting a duty in a pulse width modulation (PWM) control.

Explaining a general configuration of an electric power steering apparatus with illustration in FIG. 1, a column shaft (steering shaft) 2 of a handle (steering wheel) 1 is connected to steered wheels 8L and 8R via reduction gears 3, universal joints 4a and 4b, a pinion and rack mechanism 5, tie rods 6a and 6b, and hub units 7a and 7b. A column shaft 2 is provided with a torque sensor 10 that detects a steering torque Ts of the handle 1. A motor 20 that assists the steering force of the handle (steering wheel) 1 is connected to the column shaft 2 via the reduction gears 3. Electric power is supplied to a control unit (ECU) 30 for controlling the electric power steering apparatus from a battery 13, and an ignition key signal is inputted into the control unit 30 through an ignition key 11. The control unit 30 calculates a steering assist command value of an assist (steering assist) command based on the steering torque Ts detected by the torque sensor 10 and a vehicle speed Vs detected by the vehicle speed sensor 12 and controls a current to be supplied to the motor 20 by a voltage control value Vref, which is the steering assist command value after compensation or other processing. Note that a steering angle sensor 14 is not a requirement and may not be disposed. The steering angle may be acquired by a rotational sensor connected to the motor 20.

The control unit 30 is connected with a controller area network (CAN) 40 that receives various information of the vehicle and the vehicle speed Vs can be received from the CAN 40. The control unit 30 may also be connected with a Non-CAN 41 that receives communication, an analog/digital signal, radio waves, or others that are different from those received by the CAN 40.

In such an electric power steering apparatus, the control unit 30 mainly includes a CPU (including an MPU, an MCU, etc.). Functions executed by a program inside the CPU are illustrated as an exemplary configuration as illustrated in FIG. 2.

Functions and operations of the control unit 30 are described with reference to FIG. 2. The steering torque Ts from the torque sensor 10 and the vehicle speed Vs from the vehicle speed sensor 12 are inputted into a current command value calculating section 31. The current command value calculating section 31 calculates a current command value Iref1 based on the steering torque Ts and the vehicle speed Vs using an assist map or the like. The calculated current command value Iref1 is added with a compensation signal CM for improving characteristics from a compensating section 34 at an adding section 32A. The current command value Iref2 after addition is limited of the maximum value thereof at a current limiting section 33. The current command value Irefm limited of the maximum value is inputted into a subtracting section 32B, whereat a detected motor current value Im is subtracted from the current command value Irefm.

The subtraction result I (=Irefm−Im) at the subtracting section 32B is proportional and integral (PI)-controlled at a PI-control section 35. The PI-controlled voltage control value Vref is inputted into a PWM-control section 36, whereat a duty thereof is calculated. The motor 20 is PWM-driven by an inverter 37 with a PWM signal calculated the duty. The motor current value Im of the motor 20 is detected by a motor current detection means 38 and is inputted into the subtracting section 32B for the feedback.

The compensating section 34 adds a self aligning torque (SAT) 34-3 detected or estimated and an inertia compensation value 34-2 at an adding section 34-4. The addition result is further added with a convergence control value 34-1 at an adding section 34-5. The addition result is inputted into the adding section 32A as the compensation signal CM, thereby to improve the control characteristics.

In such an electric power steering apparatus, vehicles that have an automatic steering assist function (an automatic operation, a parking assist, etc.) and switches between the automatic steering control and the manual steering control have emerged in recent years. The vehicles having the automatic steering assist function perform the automatic steering control to set a target steering angle based on data from a camera (image), a distance sensor, or other apparatus and to cause an actual steering angle to follow the target steering angle.

In the automatic operation, environment surrounding the vehicle is recognized based on information from a radar, a camera, an ultrasonic sensor or the like and a steering angle command value that allows for safely guiding the vehicle is outputted. The electric power steering apparatus is capable of the automatic operation by performing a position control of the actual steering angle in such a manner as to follow the steering angle command value.

In the known electric power steering apparatus having the functions of the automatic steering control and the manual steering control in the related art, for example a back-in parking or a parallel parking is automatically performed by controlling an actuator (motor) based on relationship between a pre-stored traveling distance of the vehicle and a turning steering angle. That is, an automatic steering control apparatus recognizes a parking space from a positioning sensor such as an around-view monitor or an ultrasonic sensor and outputs a steering angle command value to the EPS-side. The EPS performs a position/speed-control on the actual steering angle and the steering angle speed in such a manner as to follow the steering angle command value. As a result of this, the vehicle is guided into the parking space.

FIG. 3 is a diagram illustrating a control system of an electric power steering apparatus having the automatic steering control function. An automatic steering command unit 50 is inputted with various data from a camera and a positioning sensor (ultrasonic sensor or the like). A steering angle command value θtc for automatic steering is inputted into a position/speed control section 51 in an EPS-actuator function via a CAN or the like, and an automatic steering command is inputted into an automatic steering execution judging section 52 in the EPS-actuator function via the CAN or the like. The steering torque Ts is further inputted into the automatic steering execution judging section 52. An actual steering angle θr and a steering angle speed ωr from the EPS-sensor is inputted into the position/speed control section 51 and a judgment result from the automatic steering execution judging section 52 is inputted into a torque command value gradual-change switching section 54. Further, the steering torque Ts from the EPS-sensor is inputted into a torque control section 53 in an EPS-power assist function, and a steering assist torque command value Tc from the torque control section 53 is inputted into the torque command value gradual-change switching section 54. A position/speed control torque command value Tp from the position/speed control section 51 is also inputted into the torque command value gradual-change switching section 54. According to the judgment result (ON/OFF of the automatic steering command) from the automatic steering execution judging section 52, the steering assist torque command value Tc and the position/speed control torque command value Tp are switched and output as a motor torque command value, thereby performing the drive-control of the motor via a current control system.

In this manner, a normal power assist is subjected to a torque control system. Meanwhile, the automatic operation such as the parking assist is subjected to a position/speed control system of the steering angle or other parameters. There are problems such as that the control torque varies upon the switching between the torque control and the position/speed control, thereby making the switching over not smooth and that an unintentional self-steer occurs by a trigger due to variations in the torque upon the switching over.

To handle such problems, a conventional method to gradually change (gradual-change) the control torque in the torque control and the position/speed control is used in order to mitigate the torque variations. For example in Japanese Unexamined Patent Publication No. 2004-17881 A (Patent Document 1), when an automatic steering mode is released at a time point t0 as illustrated in FIG. 4, "Sθ=OFF" is reset and thereafter an angle control ratio μ is monotonously reduced within a predetermined time ΔT. This allows a command value of a current to be conducted in a motor not to drastically vary even upon switching between the control systems.

THE LIST OF PRIOR ART DOCUMENTS

Patent Documents

Patent Document 1: Japanese Unexamined Patent Publication No. 2004-17881 A

SUMMARY OF THE INVENTION

Problems to be Solved by the Invention

Upon switching between the torque control and the position/speed control, however, the above effect cannot be fully exercised. This reason is because there are cases where assisting in an opposite direction occurs upon switching over to the normal power assist control since the position/speed control assists torque in such a manner as to suppress an external disturbance in a system such as the electric power steering that allows for inputting the external disturbance from the handle.

In this manner, the method to gradually change (gradual-change) the control torque in the torque control and the position/speed control is conventionally used in order to mitigate the torque variations. However, this cannot fully exercise its effect in the case of switching between the torque control and the position/speed control.

The present invention has been devised in consideration to the above circumstances, and an object of the present invention is to provide an electric power steering apparatus capable of smoothly switching the control systems without self-steer by gradually changing a control torque of the torque control and a command value of the position/speed control, sensitive to the steering torque, upon fade processing (gradual-change processing) that switches the control systems.

Means for Solving the Problems

The present invention relates to an electric power steering apparatus including a torque sensor to detect a steering torque and a motor control unit to control a motor that applies an assist torque to a steering system of a vehicle, the above-described object of the present invention is achieved by that comprising: a function to switch a control system of the motor between a torque control system of a torque system to control a motor output torque and a position/speed control system of a steering angle system to control a steering angle of a steering in accordance with a predetermined switching trigger, wherein each of a steering angle command value and a steering angle speed of the position/speed control system and an assist torque level of the torque control system gradually change sensitive to the steering torque, when shifting from the torque control system to the position/speed control system, or wherein each of a steering angle command value and a steering angle speed of the position/speed control system and an assist torque level of the torque control system gradually change sensitive to the steering torque, when shifting from the position/speed control system to the torque control system.

Further, the above-described object of the present invention is more effectively achieved by that further comprising a characteristic calculating section to calculate a fade gain signal F1 that applies a fade characteristic 1 of the torque system, a fade gain signal F2 that applies a fade characteristic 2 of the steering angle system, and a fade gain signal F3 that applies a fade characteristic 3 of the steering angle speed, sensitive to the steering torque, when the predetermined switching trigger is switched-ON/OFF; or wherein, when the predetermined switching trigger is switched-ON, a post-gradual change steering-angle command value in a position/speed control is gradually changed from an actual steering angle to a steering angle command value by the fade gain signal F2, a level of the assist torque in a torque control is gradually changed from 100% to 0% by the fade gain signal F1, the steering angle speed is gradually changed from 0% to 100% by the fade gain signal F3, and then the position/speed control system is operated; or wherein, when the predetermined switching trigger is switched-OFF, a post-gradual change steering-angle command value in a position/speed control is gradually changed from a steering angle command value to an actual steering angle by the fade gain signal F2, a level of the assist torque in a torque control is gradually changed from 0% to 100% by the fade gain signal F1, the steering angle speed is gradually changed from 100% to 0% by the fade gain signal F3, and then the torque control system is operated; or wherein, by respectively setting a past value $FG(Z^{-1})$ of a fade gain, an exponential gain A, and a fade rate FR, the fade gain signals F1, F2 and F3 are calculated by a form of "$A \times x FG(Z^{-1}) + FR$"; or wherein the predetermined switching trigger is performed by an automatic steering execution judging section; or wherein the automatic steering execution judging section comprises: a calculating section to calculate an angular speed and an angular acceleration by inputting a steering angle command value; a map judging section to judge each of the steering angle command value, the angular speed and the angular acceleration with a judging map corresponding to a vehicle speed; and a diagnosing section to diagnose based on a judgement result from the map judging section; or further comprising an external disturbance observer to compensate inertia and friction of a handle; or wherein the external disturbance observer estimates an external-disturbance estimation torque from a difference between an output of a steering inverse model of the steering system and an output of an LPF to limit a band; or wherein values of inertia and friction of the steering system are greater than or equal to values of inertia and friction of the steering inverse model, respectively.

Effects of the Invention

According to the electric power steering apparatus of the present invention, a post-gradual change steering angle command value is gradually changed from the actual steering angle to the steering angle command value and the actual steering angle is subjected to the position control and the speed control in such a manner as to follow the post-gradual change steering angle command value and the post-gradual change steering-angle speed. This allows the torque command value in the position/speed control to be changed automatically and smoothly, thereby providing a soft handling feeling to a driver. Further, even when excessive variations in the torque occur upon a fade processing of switching from the automatic steering to the torque control, an excessive power assist by the torque control is automatically compensated by the position/speed control since the steering angle command and the steering angle speed are gradually changed, sensitive to the steering torque. Therefore, it is possible to suppress such a failure as to losing the control of the handle by the driver.

Moreover, according to the electric power steering apparatus of the present invention, the switch (shift) between the automatic steering operation which an intention of the driver is respected and the normal steering by the torque control is performed by the smooth operation. In a case that the driver feels a danger in the automatic operation and strongly steers a handle, the automatic operation is immediately stopped and the switch to the normal torque control can be performed. Providing the external disturbance observer can effectively improve the effects.

BRIEF DESCRIPTION OF THE DRAWINGS

In the accompanying drawings:

FIG. 18 is a characteristic diagram illustrating another example of the exponential gain;

FIGS. 20A and 20B are characteristic diagrams for explaining effects (fade processing) of the present invention;

MODE FOR CARRYING OUT THE INVENTION

In a conventional torque gradual-change control in the electric power steering apparatus, there are problems such as that control is not smoothly switched upon switching between a torque control and a position/speed control and that unintentional self-steer occurs.

In the present invention, therefore, a processing that smoothly switches the control without the self-steer is implemented by gradually changing (fade processing) a control torque of a torque control (an assist torque level) and a command value of a position/speed control (a steering angle command value and a steering angle speed) sensitive to the steering torque.

The present invention includes a function to switch control systems of a motor between a torque control system to control a motor output torque and a position/speed control system to control a steering angle upon steering in accordance with a predetermined switching trigger (e.g. an automatic steering command), can change a fade processing (a gradual-changing time and a gain) sensitive to the steering torque, and implements the smooth fade processing without the self-steer.

Figure 1:
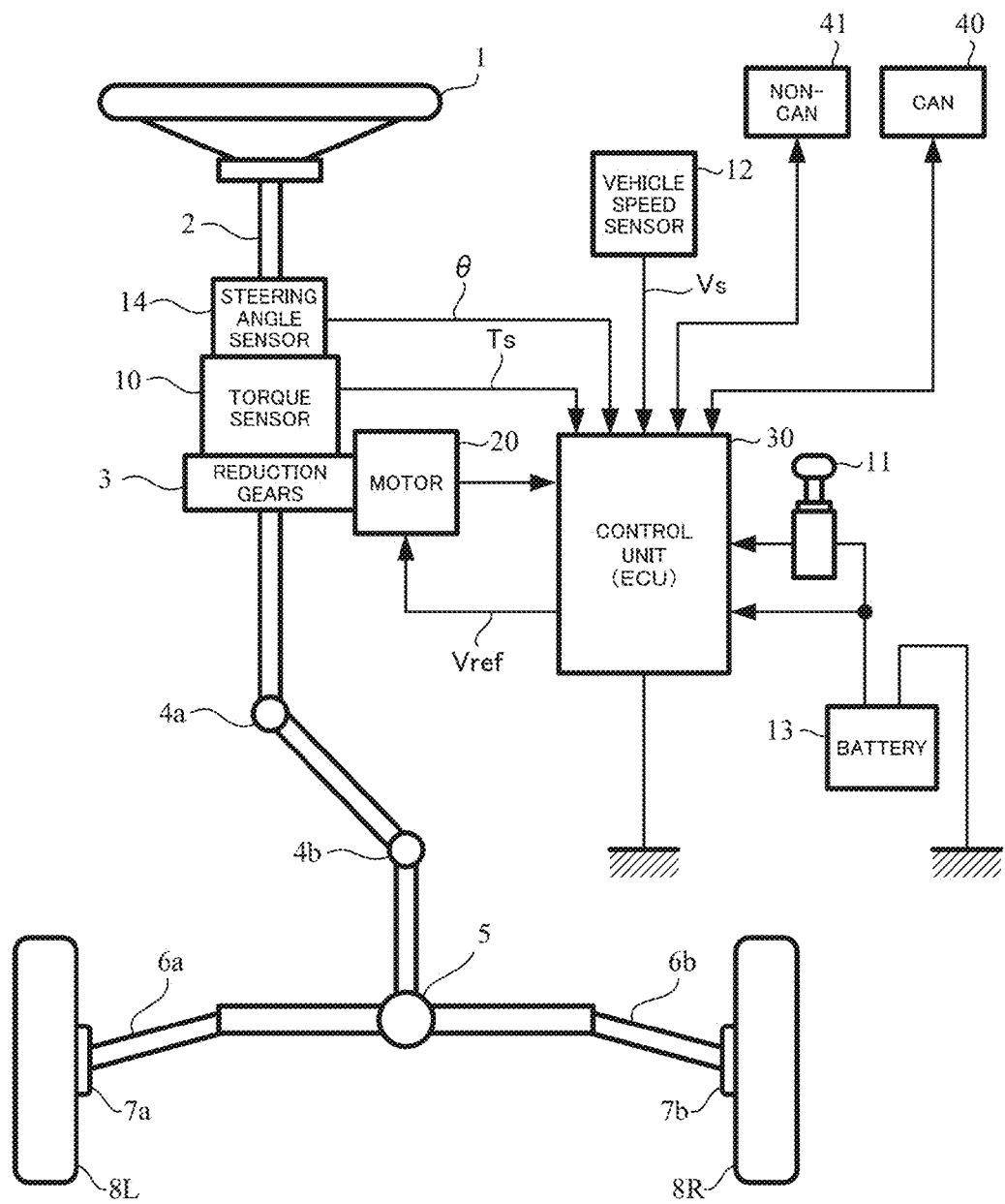
FIG. 1 is a configuration diagram illustrating an overview of an electric power steering apparatus (column system)
Figure 2:
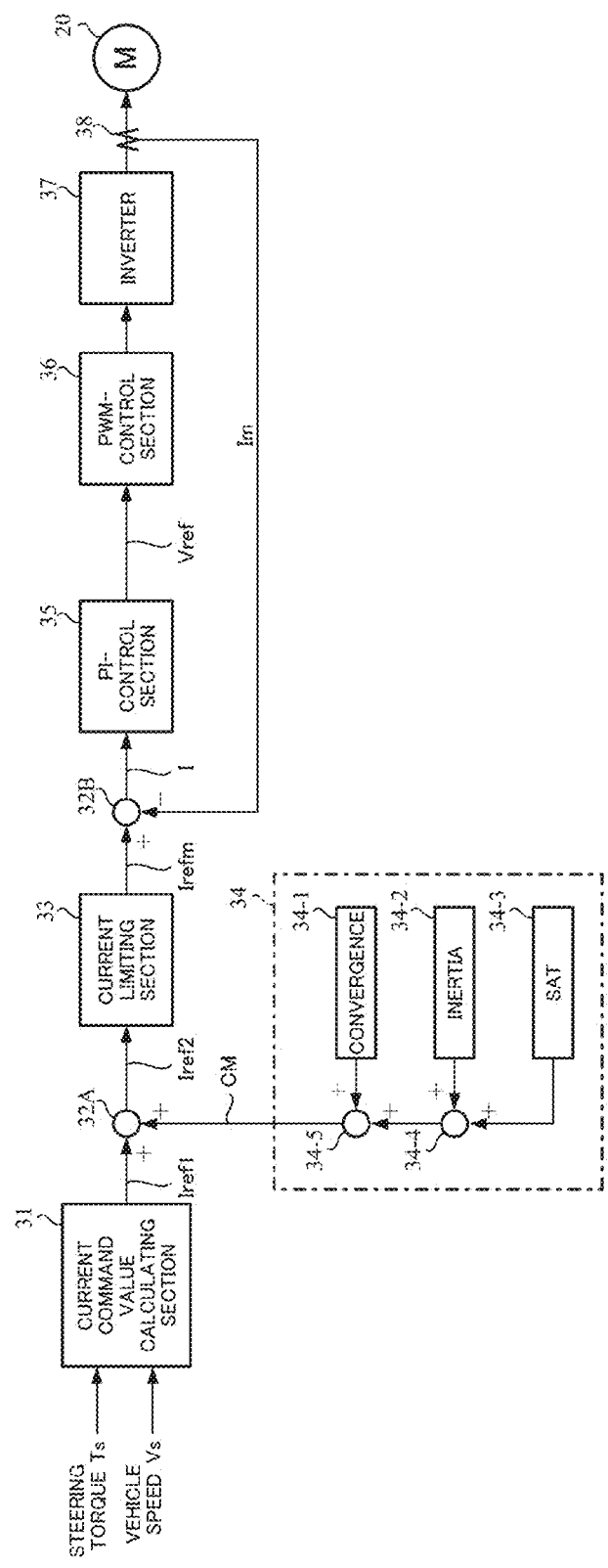
FIG. 2 is a block diagram illustrating an exemplary configuration of a control system of the electric power steering apparatus.
Figure 3:
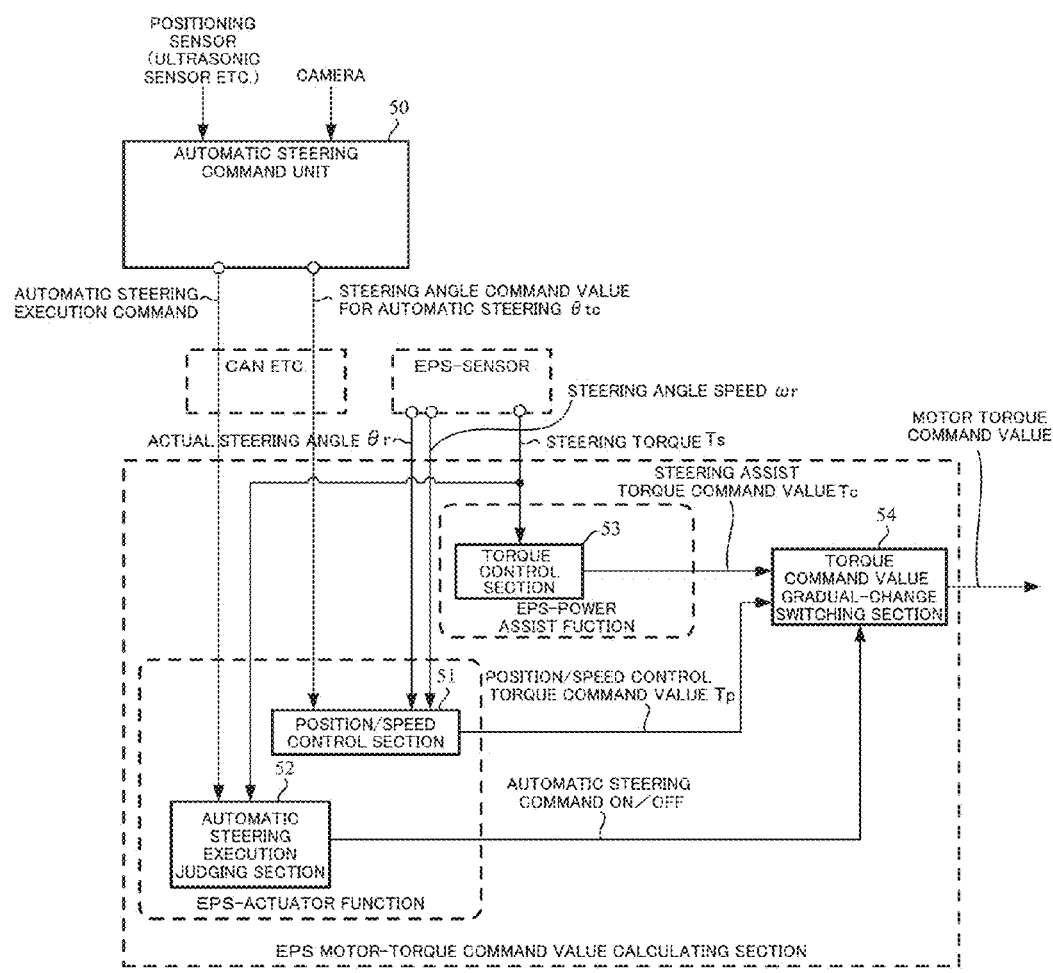
FIG. 3 is a block diagram illustrating an exemplary configuration of a control system of the electric power steering apparatus having a parking assist mode (automatic steering) function.
Figure 4:
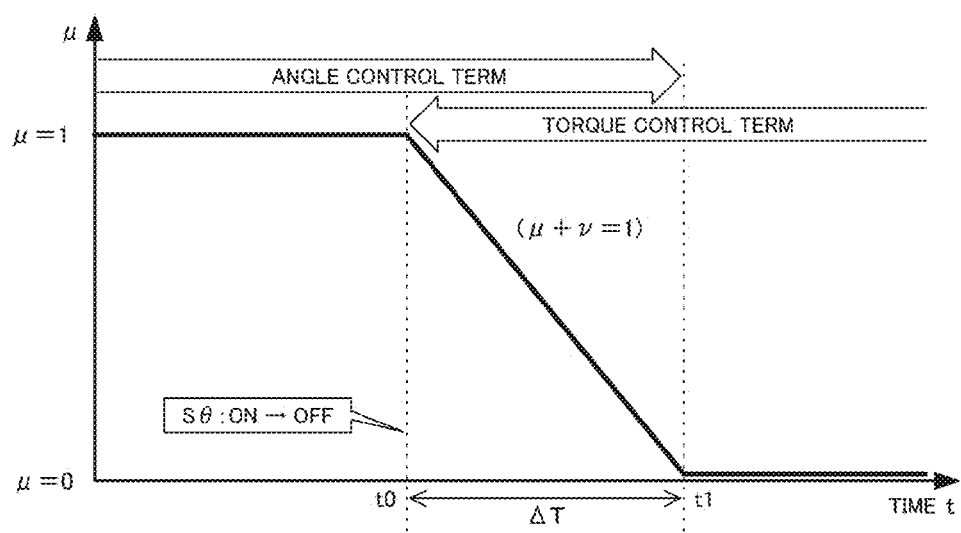
FIG. 4 is a characteristic diagram illustrating operation system of a conventional electric power steering apparatus.
Figure 5:
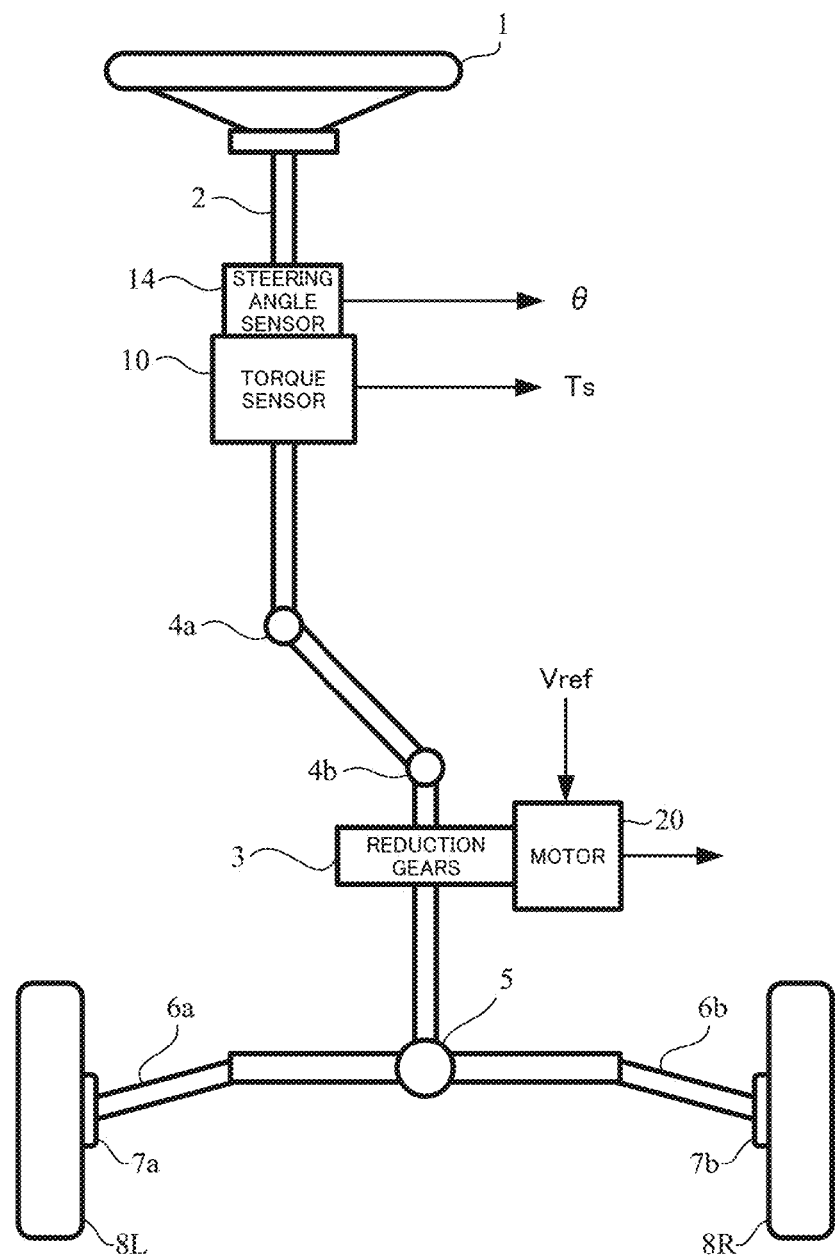
FIG. 5 is a configuration diagram illustrating an overview of an electric power steering apparatus (single pinion system)
Figure 6:
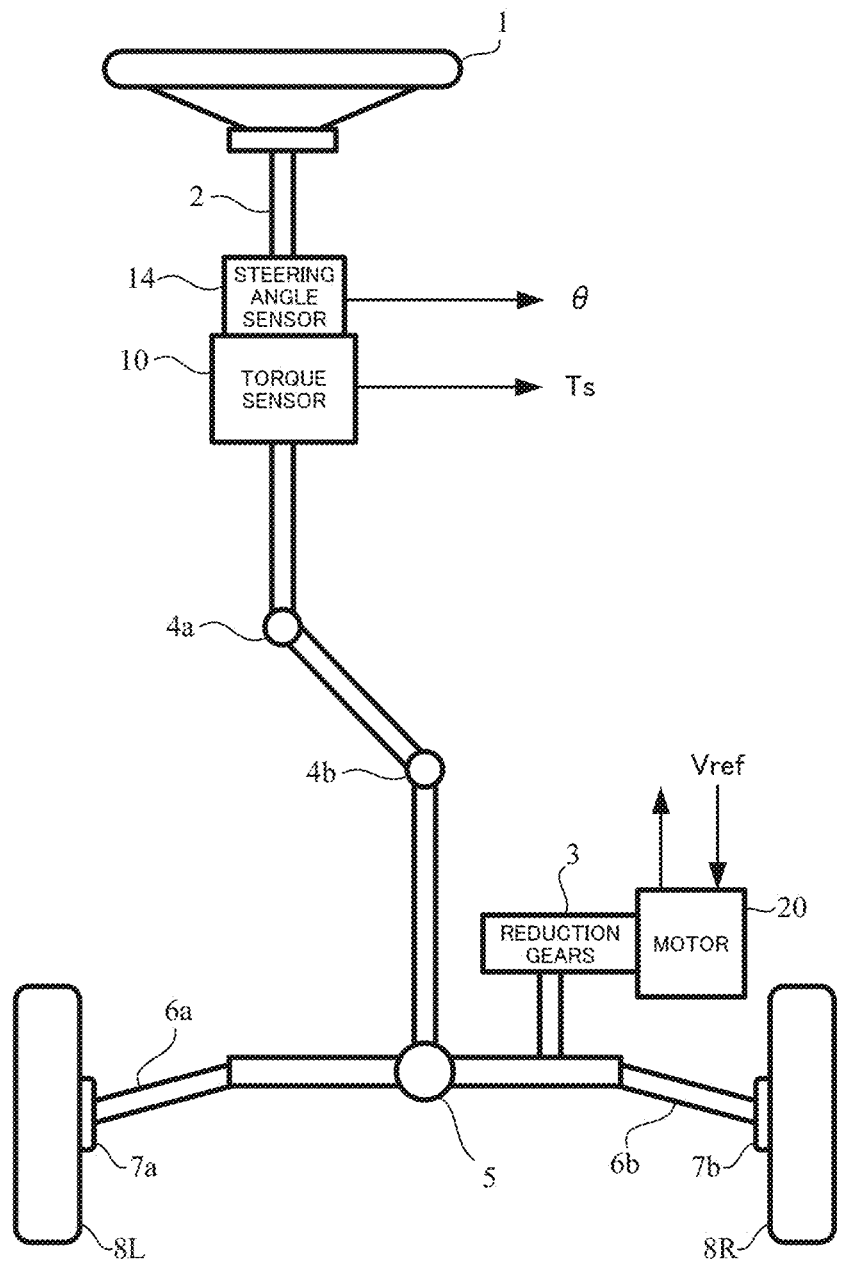
FIG. 6 is a configuration diagram illustrating an overview of an electric power steering apparatus (dual pinion system)
Figure 7:
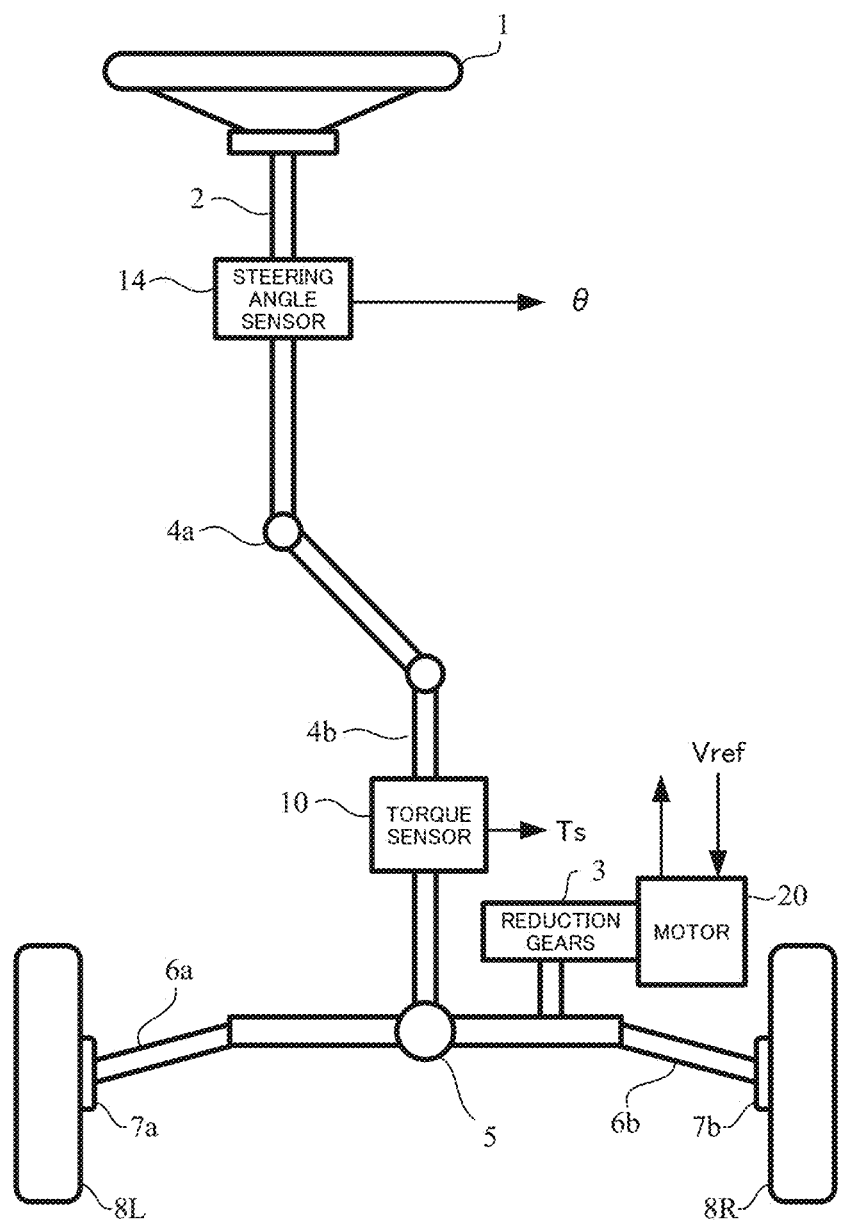
FIG. 7 is a configuration diagram illustrating an overview of an electric power steering apparatus (dual pinion system (exemplary variation))
Figure 8:
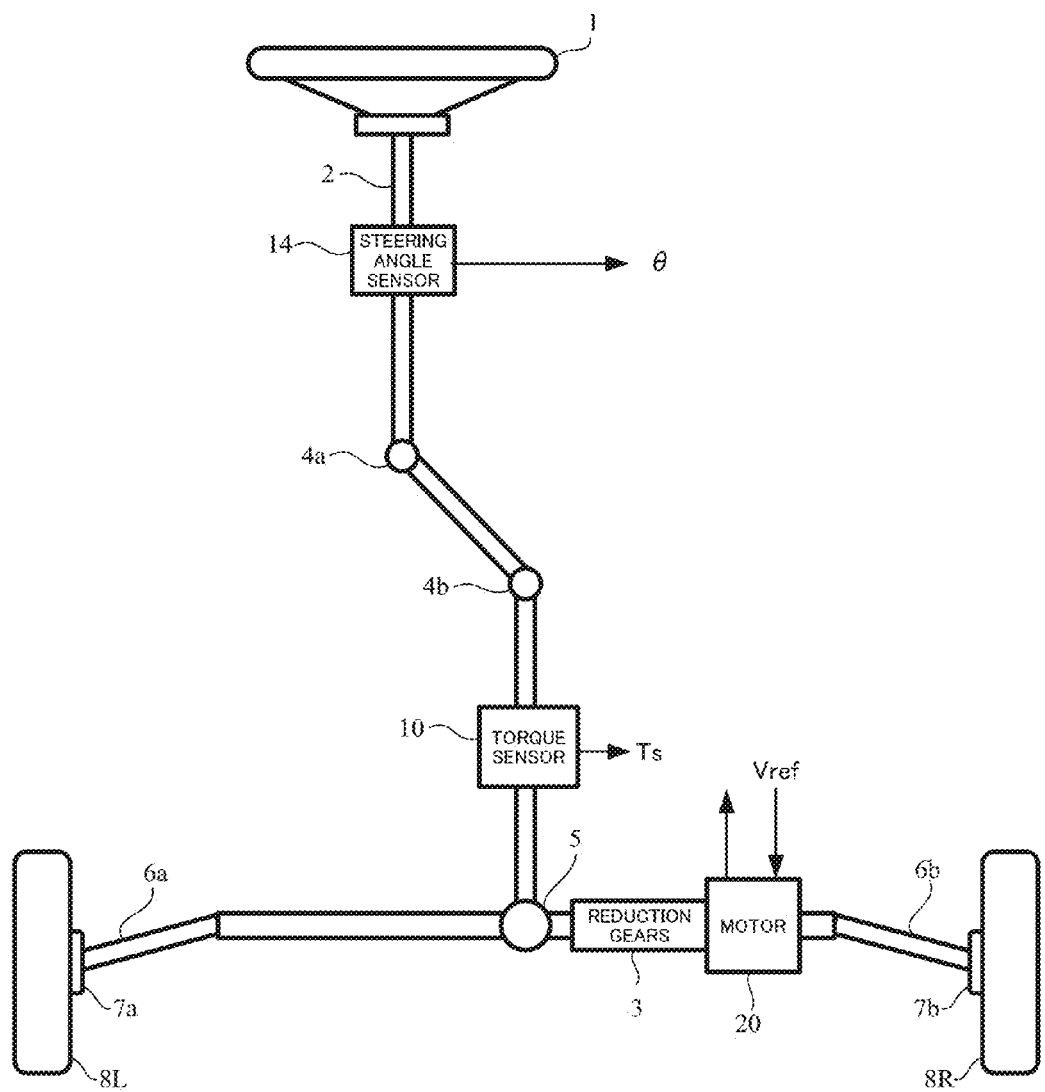
FIG. 8 is a configuration diagram illustrating an overview of an electric power steering apparatus (coaxial rack system)
Figure 9:
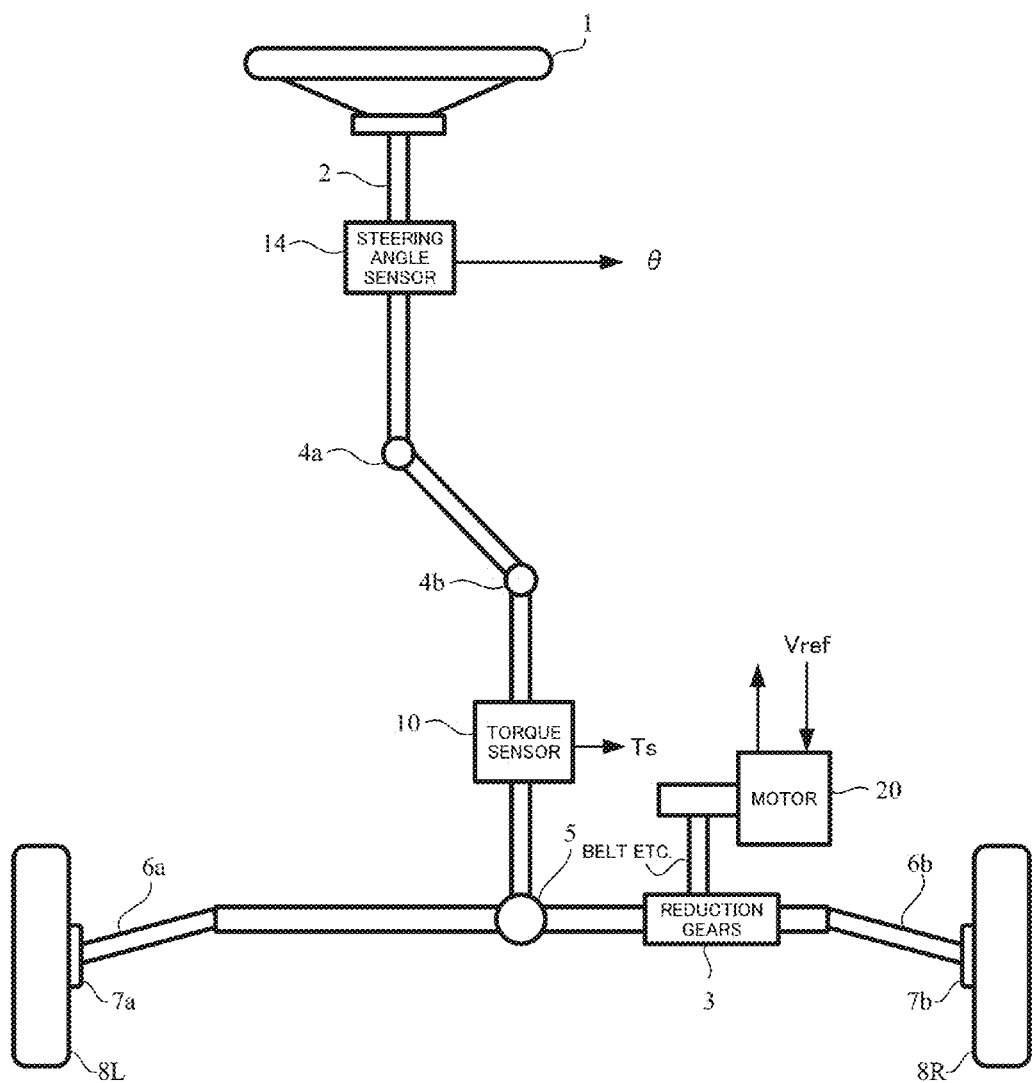
FIG. 9 is a configuration diagram illustrating an overview of an electric power steering apparatus (rack offset system)

Hereinafter, embodiments of the present invention will be described in detail with reference to the drawings. The present invention may be applied to, other than the column system shown in FIG. 1, a single pinion system a schematic configuration of which is shown in FIG. 5, a dual pinion system an overview of which is shown in FIG. 6, a dual pinion system (exemplary variation) a schematic configuration of which is shown in FIG. 7, a rack coaxial system an overview of which is shown in FIG. 8, and a rack offset system an overview of which is shown in FIG. 9. The below descriptions will be given on the column system.

Figure 10:
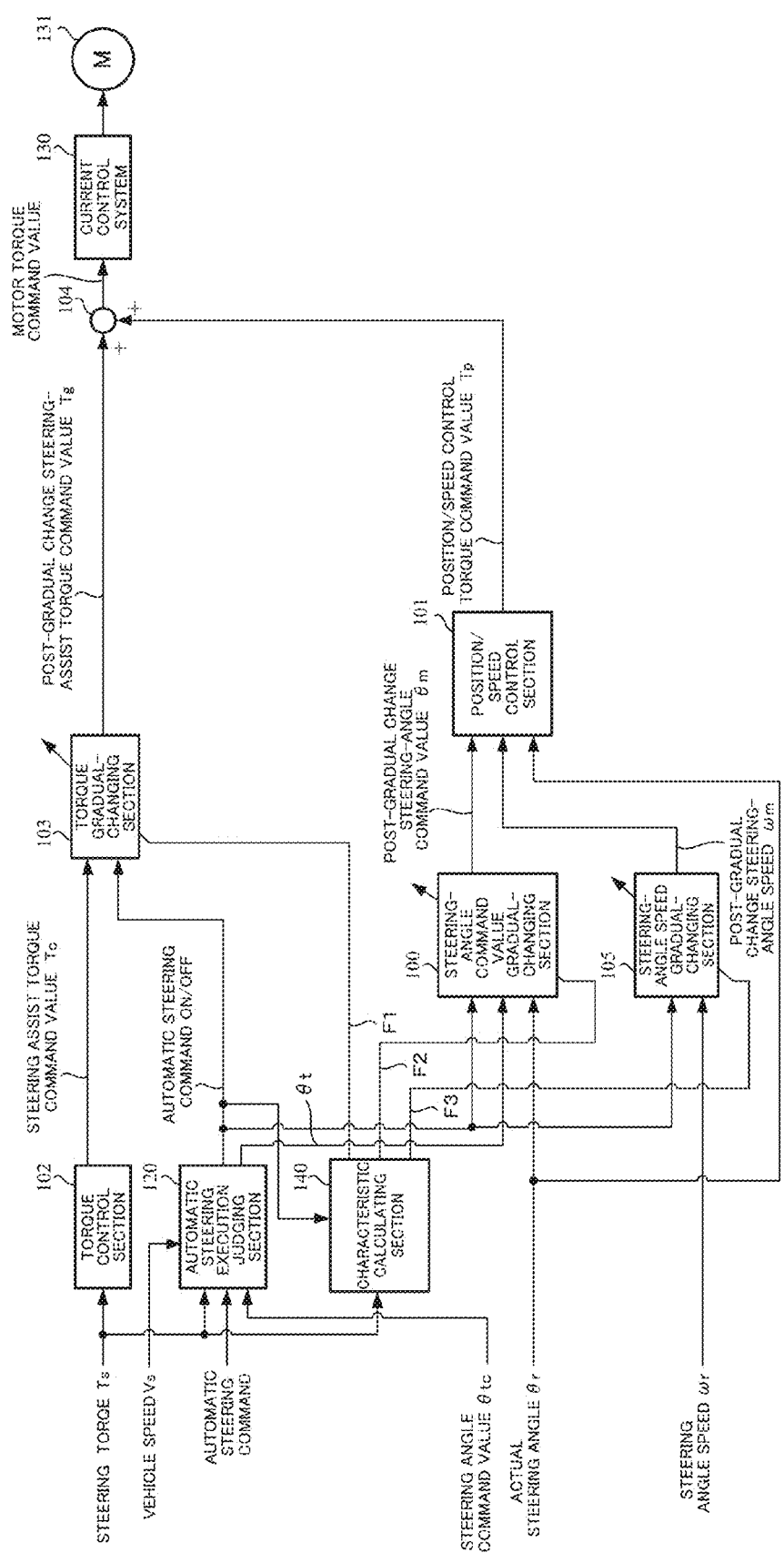
FIG. 10 is a block diagram illustrating an exemplary configuration of the present invention.

FIG. 10 is a diagram illustrating an exemplary configuration of the present invention, and the steering torque Ts is inputted into a torque control section 102, and is also inputted into an automatic steering execution judging section 120, and a characteristic calculating section 140 as a changeable parameter. A steering assist torque command value Tc from the torque control section 102 is inputted into a torque gradual-changing section 103. A steering angle command value θtc from a CAN or the like is inputted into the automatic steering execution judging section 120, the steering angle command value θt after calculation processing at the automatic steering execution judging section 120 is inputted into a steering-angle command value gradual-changing section 100 of the steering angle system together with an actual steering angle θr. Further, the automatic steering execution judging section 120 outputs ON/OFF of the automatic steering command being a judgment result. The "ON/OFF" of the automatic steering command is inputted into the torque gradual-changing section 103, the steering-angle command value gradual-changing section 100, a steering-angle speed gradual-changing section 105 and the characteristic calculating section 140.

The actual steering angle θr is inputted into the steering-angle command value gradual-changing section 100 and a position/speed control section 101, and the steering angle speed ωr is inputted into the steering-angle speed gradual-changing section 105. A post-gradual change steering-angle command value θm from the steering-angle command value gradual-changing section 100 and a post-gradual change steering-angle speed ωm from the steering-angle speed gradual-changing section 105 are inputted into the position/speed control section 101. Based on the steering torque Ts, a fade gain signal F1 of a torque system, which is calculated at the characteristic calculating section 140, is inputted into the torque gradual-changing section 103, a fade gain signal F2 of a steering angle system is inputted into the steering-angle command value gradual-changing section 100, and a fade gain signal F3 of a steering angle speed system is inputted into the steering-angle speed gradual-changing section 105.

A post-gradual change steering-assist torque command value Tg at the torque gradual-changing section 103 is inputted into an adding section 104, a position/speed control torque command value Tp from the position/speed control section 101 is also inputted into the adding section 104, and an addition result of the adding section 104 is outputted as a motor torque command value. The motor torque command value is inputted into a current control system 130, and a motor 131 is driven and controlled through the current control system 130.

When the automatic steering command is switched-ON or -OFF by the automatic steering execution judging section 120, the characteristic calculating section 140 calculates the fade gain signal F1 for the torque gradual-change, the fade gain signal F2 for the steering-angle command value gradual-change and the fade gain signal F3 for the steering-angle speed gradual-change, and the gradual-changes (a time and a gain) for respective elements are performed sensitive to the steering torque Ts.

Figure 11:
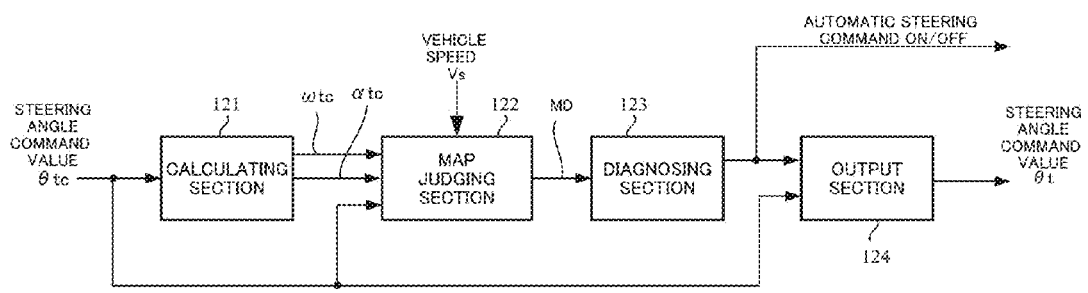
FIG. 11 is a block diagram illustrating an exemplary configuration of an automatic steering execution judging section.
Figure 12A:
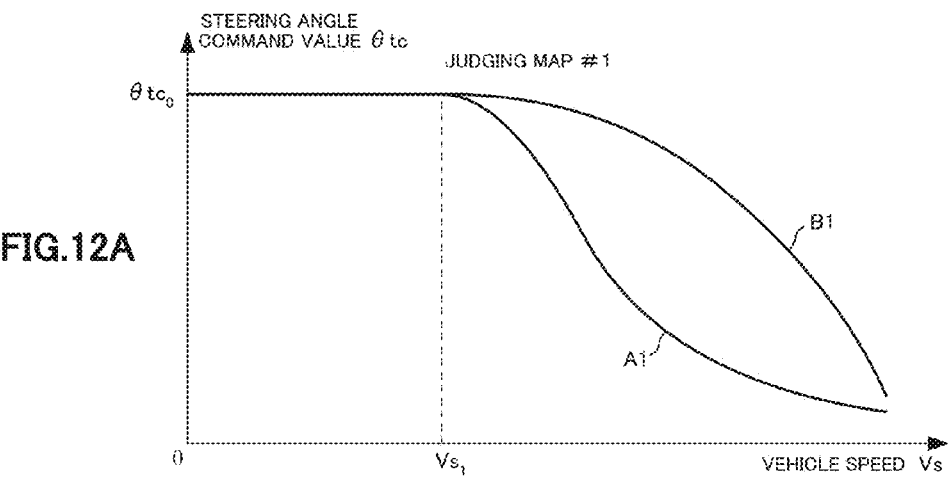
FIGS. 12A to 12C are characteristic diagrams illustrating exemplary judging maps (steering angle command value, angular speed and angular acceleration)
Figure 12B:
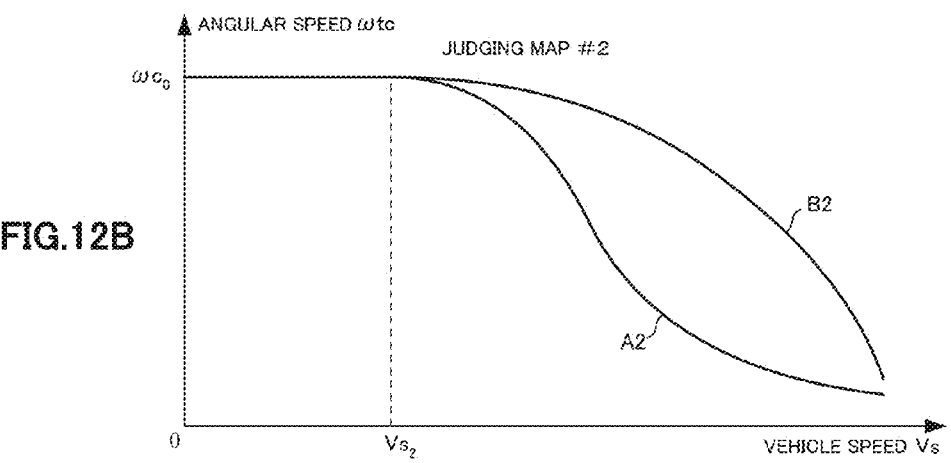
Figure 12C:
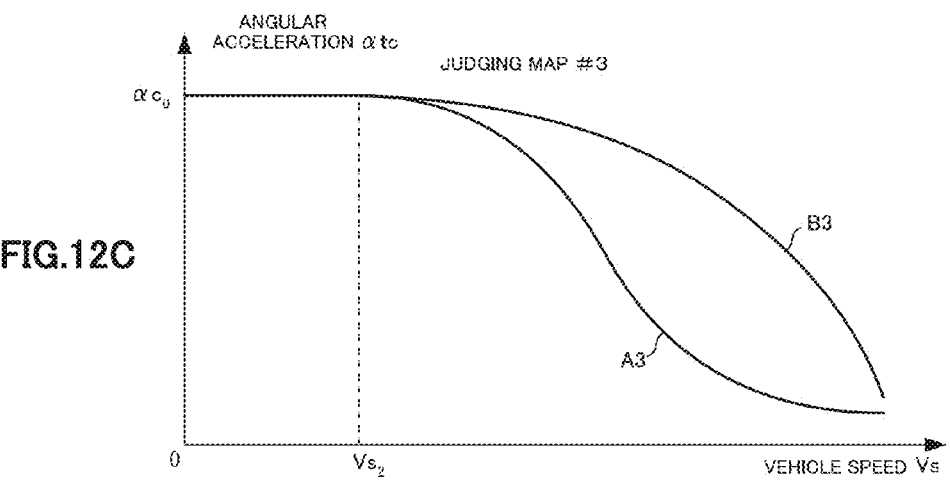

The automatic steering execution judging section 120 has a configuration as illustrated in FIG. 11, the steering angle command value θtc is inputted into a calculating section 121, and the calculating section 121 calculates an angular speed ωtc and an angular acceleration αtc based on the steering angle command value θtc. The angular speed ωtc and the angular acceleration αtc are inputted into a map judging section 122 to judge using a judging map. The map judging section 122 is also inputted with the steering angle command value θtc and a vehicle speed Vs. The map judging section 122 includes a judging map #1 for a steering angle command value θtc having a characteristic A1 or B1 as shown in FIG. 12A, a judging map #2 for an angular speed ωtc having a characteristic A2 or B2 as shown in FIG. 12B, and a judging map #3 for an angular acceleration αtc having a characteristic A3 or B3 as shown in FIG. 12C.

The characteristic of the judging map #1 with respect to the steering angle command value θtc is at a constant value $θtc_0$ until a vehicle speed $Vs_1$ of a low speed and decreases as the characteristic A1 or B1 in a range more than or equal to the vehicle speed $Vs_1$. The characteristic of the judging map #2 with respect to the angular speed ωtc is at a constant value $ωc_0$ until a vehicle speed $Vs_2$ of a low speed and decreases as the characteristic A2 or B2 in a range more than or equal to the vehicle speed $Vs_2$. Further, the characteristic of the judging map #3 with respect to the angular acceleration αtc is at a constant value $αc_0$ until a vehicle speed $Vs_3$ of a low speed and decreases as the characteristic A3 or B3 in a range more than or equal to the vehicle speed $Vs_3$. Any of the characteristics of the judging maps #1 to #3 can be tuned, and the characteristic may linearly decrease.

The map judging section 122 judges whether the steering angle command value θtc exceeds the range of characteristic values of the judging map #1, whether the angular speed ωtc exceeds the range of characteristic values of the judging map #2, and further whether the angular acceleration αtc exceeds the range of characteristic values of the judging map #3. A judgment result MD is inputted into a diagnosing section 123. The diagnosing section 123 outputs "ON/OFF" of the automatic steering command based on a diagnosis result by time or times (number) and "ON/OFF" of the automatic steering command is also inputted into an output section 124. The output section 124 outputs the steering angle command value θt only when the automatic steering command is "ON".

Although the steering angle command value θt is inputted into the steering-angle command value gradual-changing section 100 together with the actual steering angle θr, the actual steering angle θr is calculated in the following manner in the present invention.

Figure 13:
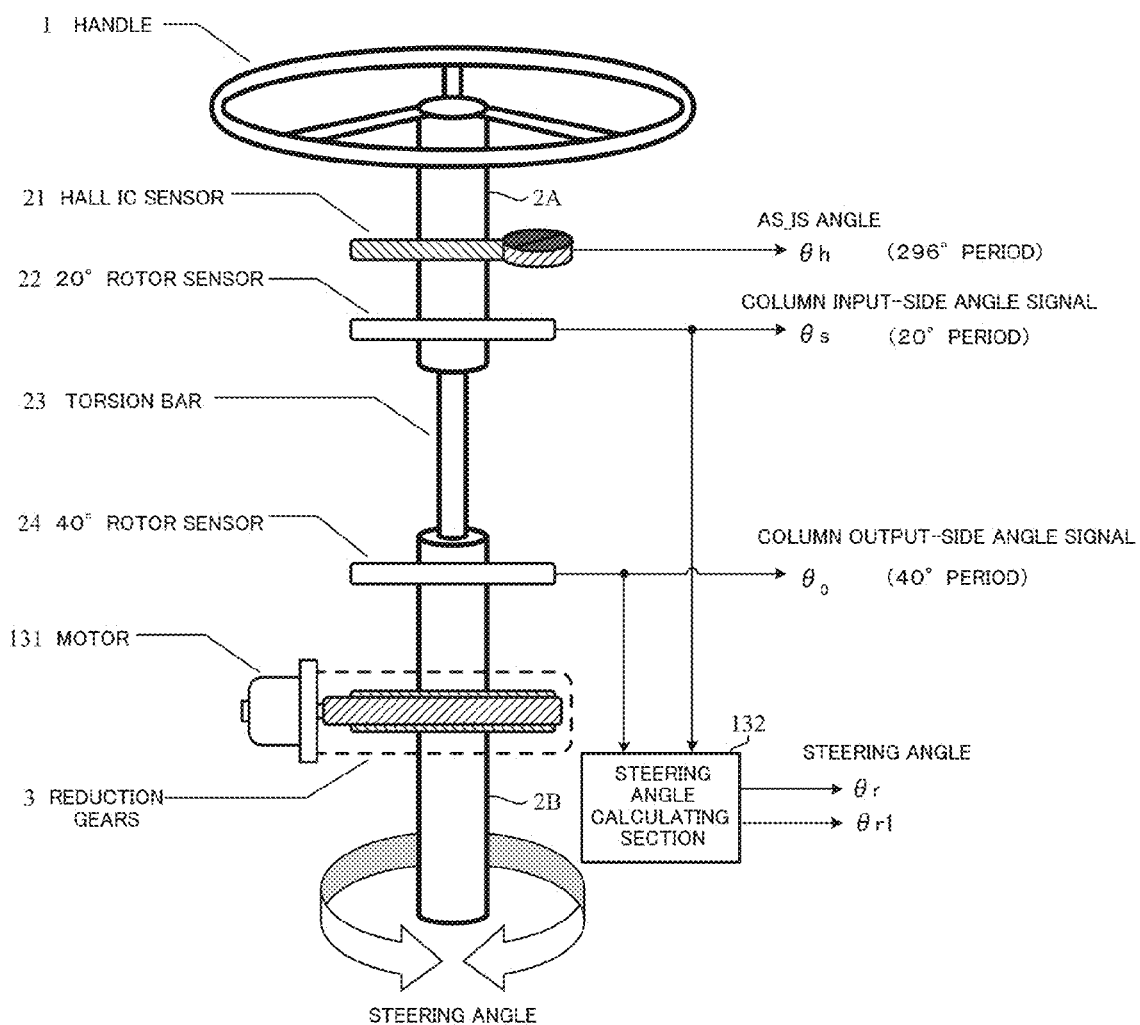
FIG. 13 is a diagram illustrating relationship between an example of mounting sensors and an actual steering angle used in the present invention.

In a mechanism including a torsion bar 23, for example a sensor as illustrated in FIG. 13 is mounted to a column shaft 2 (2A (input side) and 2B (output side)) and thereby the steering angle is detected. That is, the input shaft 2A on a handle 1 side of the column shaft 2 is mounted with a Hall IC sensor 21 as an angle sensor and a 20° rotor sensor 22 for a torque sensor input-side rotor. The Hall IC sensor 21 outputs an AS_IS angle θh with 296° period. The 20° rotor sensor 22 mounted on the handle 1 side with respective to the torsion bar 23 outputs a column input-side angle θs with 20° period and the column input-side angle θs is inputted into a steering angle calculating section 132. The output shaft 2B on the column shaft 2 is mounted with a 40° rotor sensor 24 for a torque sensor output-side rotor. The 40° rotor sensor 24 outputs a column output-side angle θo and the column output-side angle θo is inputted into the steering angle calculating section 132. The column input-side angle θs and the column output-side angle signal θo are both calculated into an absolute angle by the steering angle calculating section 132. The steering angle calculating section 132 then outputs a steering angle θr on the column input-side and a steering angle θr1 on the column output-side of an absolute value.

Although the present invention descriptions are given assuming that the steering angle θr on the column input-side is the actual steering angle, the steering angle θr1 on the column output-side may be used as the actual steering angle.

Figure 14:
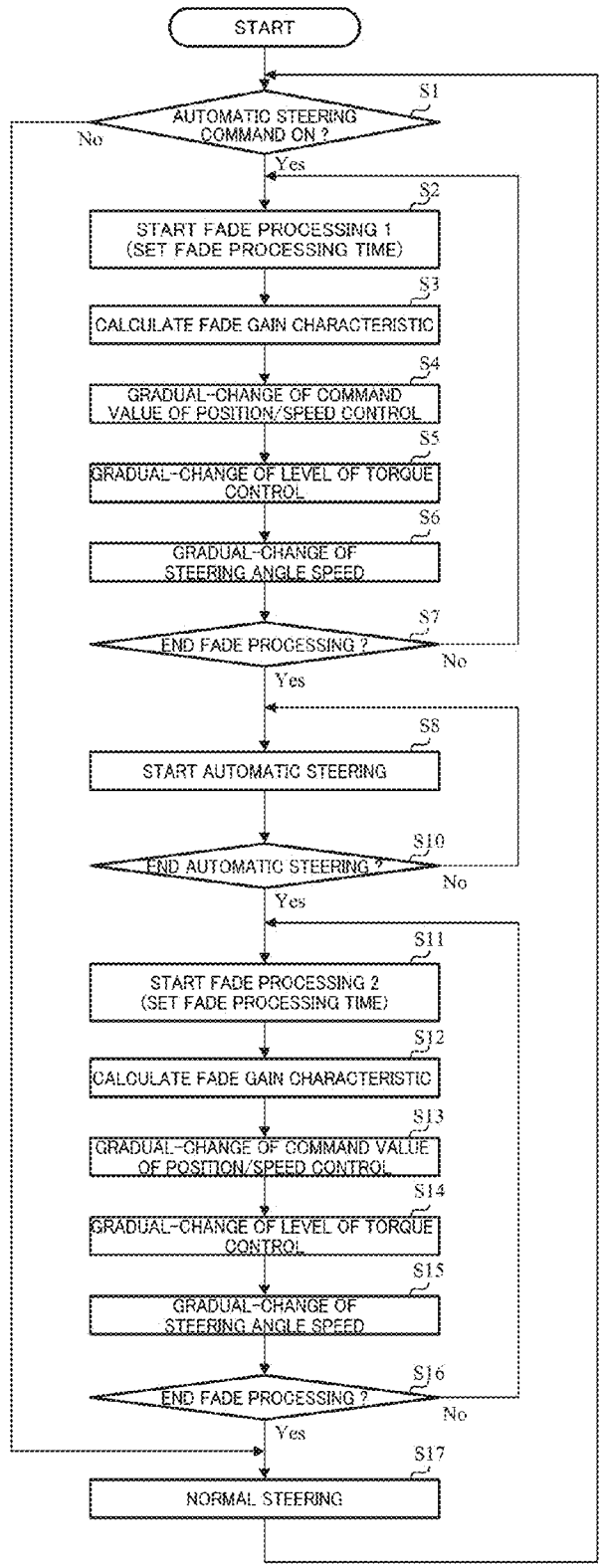
FIG. 14 is a flowchart illustrating exemplary operations of the present invention.

Exemplary operations in such a configuration will be described with reference to flowcharts in FIG. 14 and FIG. 15 and a timing chart in FIG. 16.

When the automatic steering command is not "ON" (Step S1), the normal steering with the assist torque level of 100%, that is, the torque control is performed (Step S17). Then, when the automatic steering execution judging section 120 turns "ON" the automatic steering command at a time point t2 (Step S1), a fade processing of the EPS is started from the time point t2 (Step S2). At this time, the fade gain signals F1 to F3 are calculated based on the steering torque Ts at the characteristic calculating section 140, the fade gain signal F1 is inputted into the torque gradual-changing section 103, the fade gain signal F2 is inputted into the steering-angle command value gradual-changing section 100, and the fade gain signal F3 is inputted into the steering-angle speed gradual-changing section 105 (Step S3). A fade processing time and a fade gain characteristics are set by the fade gain signals F1 to F3, respectively. The characteristic section 140 calculates the fade gain signal F1 in accordance with a following Equation 1, calculates the fade gain signal F2 in accordance with a following Equation 2, and calculates the fade gain signal F3 in accordance with a following Equation 3.

$$F1 = A1 \times FG(z^{-1}) + FR1 \quad \text{[Equation 1]}$$

where FR1 is a fade rate that determines a rate of the fade which varies in a control period, A1 is an exponential gain that determines a gradient of an exponential, and $FG(z^{-1})$ is a past value of the fade gain.

$$F2 = A2 \times FG(z^{-1}) + FR2 \quad \text{[Equation 2]}$$

where FR2 is the fade rate that determines the rate of the fade which varies in the control period, A2 is the exponential gain that determines the gradient of the exponential, and $FG(z^{-1})$ is the past value of the fade gain.

$$F3 = A3 \times FG(z^{-1}) + FR3 \quad \text{[Equation 3]}$$

where, FR3 is the fade rate that determines the rate of the fade which varies in the control period, A3 is the exponential gain that determines the gradient of the exponential, and $FG(z^1)$ is the past value of the fade gain.

Figure 17:
FIG. 17 is a characteristic diagram illustrating an example of an exponential gain.

In the Equation 1 to the Equation 3, when the exponential gains A1 to A3 are set to "1.0", the fade characteristics are a linear line. The time of the fade processing and the gain are controlled by changing the exponential gains A1, A2 and A3 sensitive to the steering torque Ts. In the fade processing between a time point t2 and a time point t4, the exponential gain A1 is related to the torque gradual-change, and is a constant value A12 where the steering torque is less than a predetermined value of a steering torque T11, gradually decreases to a value A11 (<A12) where the steering torque is the predetermined value T11 or more and a predetermined value T12 (>T11) or less, and is a constant value A11 in a region where the steering torque is larger than the predetermined value T12, for example as shown in FIG. 17. The exponential gain A2 is related to the steering-angle command value gradual-change, and is a constant value A21 where the steering torque is less than a predetermined value of a steering torque T21, gradually increases to a value A22 (>A21) where the steering torque is the predetermined value T21 or more and a predetermined value T22 (>T21) or less, and is a constant value A22 in a region where the steering torque is larger than the predetermined value T22, for example as shown in FIG. 18.

Figure 16:
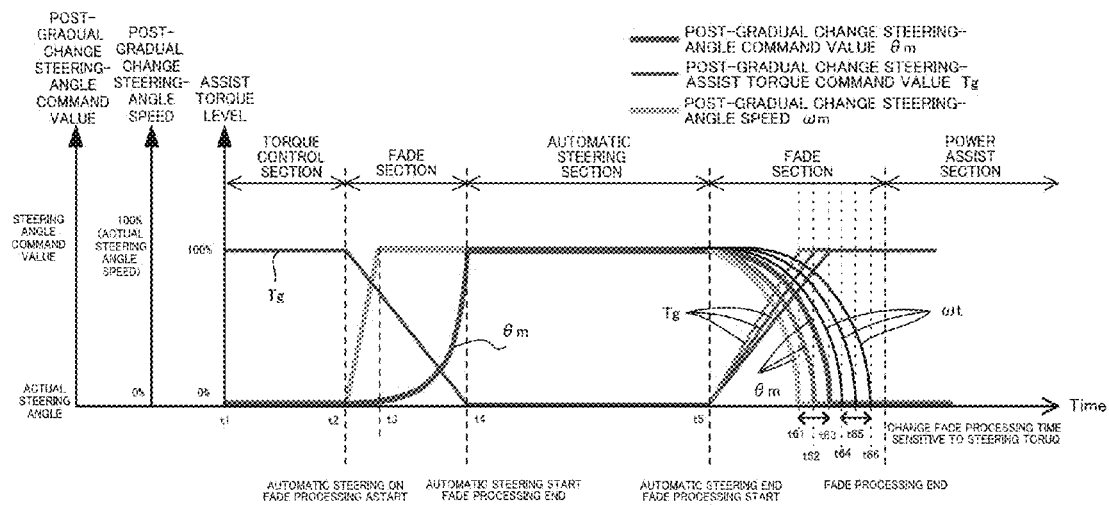
FIG. 16 is a timing chart illustrating exemplary operations of the present invention.

Although the above Equation 3 is applied to the steering angle speed, in a case of an example of FIG. 16, the steering angle speed is gradually changed linearly (A3=0) between the time point t2 and a time point t3 and is a constant value between the time point t3 and the time point t4.

The steering torque T11 as shown in FIG. 17 and the steering torque T21 as shown in FIG. 18 may be the same value, and the steering torque T12 as shown in FIG. 17 and the steering torque T22 as shown in FIG. 18 may be the same value. Further, a decreasing characteristic and an increasing characteristic may be nonlinear or a function. Moreover, these may be freely tuned according to handling feeling.

The steering-angle command value gradual-changing section 100 gradually changes the post-gradual change steering-angle command value θm of the position/speed control from the actual steering angle θr to the steering angle command value θt (Step S4). The torque gradual-changing section 103 gradually changes the torque level from 100% to 0% in accordance with the fade gain signal F1 (Step S5). The steering-angle speed gradual-changing section 105 gradually changes the post-gradual change steering-angle speed ωm from 0% to 100% by the time point t3 in accordance with the fade gain signal F3 (Step S6). Thereafter, the above operations are repeated until the fade processing 1 ends (the time point t4) (Step S7).

As well, the command value gradual-change of the position/speed control, the level gradual-change of the torque control and the gradual-change of the steering angle speed in a fade section (a gradual-change time) may be in any order. In the timing chart of FIG. 16, it is not shown that the fade processing time (between the time point t2 and the time point t4) is changeable sensitive to the steering torque Ts.

At and after a time point t4 when the fade processing 1 ends, the torque control is switched to the automatic steering (the position/speed control) and then the automatic steering is continued (Step S8).

Thereafter, when the automatic steering command is switched-"OFF" by the automatic steering execution judging section 120 (a time point t5), or when a driver steers the handle during the automatic steering such that the steering torque Ts exceeds a certain threshold and the automatic steering command is switched-"OFF" (the time point t5), the automatic steering is completed (Step S10) and the fade processing 2 is started (Step S11).

In this case, the fade gain signals F1 to F3 based on the steering torque Ts are calculated in accordance with the above Equations 1 to 3 at the characteristic calculating section 140, the fade gain signal F2 is inputted into the steering-angle command value gradual-changing section 100, the fade gain signal F1 is inputted into the torque gradual-changing section 103, and the fade gain signal F3 is inputted into the steering-angle speed gradual-changing section (Step S12).

In this way, the steering-angle command value gradual-changing section 100 gradually changes the post-gradual change steering-angle command value θm of the position/speed control from the steering angle command value θt to the actual steering angle θr (Step S13), the torque gradual-changing section 103 gradually changes the torque level from 0% to 100% (Step S14), and the steering-angle speed gradual-changing section 105 gradually changes the post-gradual change steering-angle speed ωm from 100% to 0% (Step S15). This fade processing 2 is continued until a time point t63 (Step S16). At and after the time point t63 when the fade processing ends, the automatic steering is switched to the torque control of the normal steering (Step S17).

Even in this fade processing 2, the fade gain signals F1 to F3 are calculated by the above Equations 1 to 3, respectively. Thus, in this fade processing 2, the calculations of following Equations 4 to 6 are performed.

$$F1 = A2 \times FG(Z^{-1}) + FR2 \quad \text{[Equation 4]}$$

$$F2 = A1 \times FG(Z^{-1}) + FR1 \quad \text{[Equation 5]}$$

$$F3 = A3 \times FG(Z^{-1}) + FR3 \quad \text{[Equation 6]}$$

In this case, the exponential gains A2 and A3 of the fade gain signal F1 and F3 have a characteristic as shown in FIG. 18, and the exponential gain A1 of the fade gain signal F2 has a characteristic as shown in FIG. 17.

Note that, a fading characteristic of the steering angle command value in the position/speed control is represented by an exponential curve while the torque gradual-change in the torque control is represented by a linear line in FIG. 16, however, these may be a nonlinear characteristic or a function characteristic, or may be freely tuned according to handling feeling. The above characteristics are applicable to the gradual-change in the steering angle speed. Further, a term between the time point t3 and the time point t4 in FIG. 16 is an automatic steering section with a deviation "0".

Figure 15:
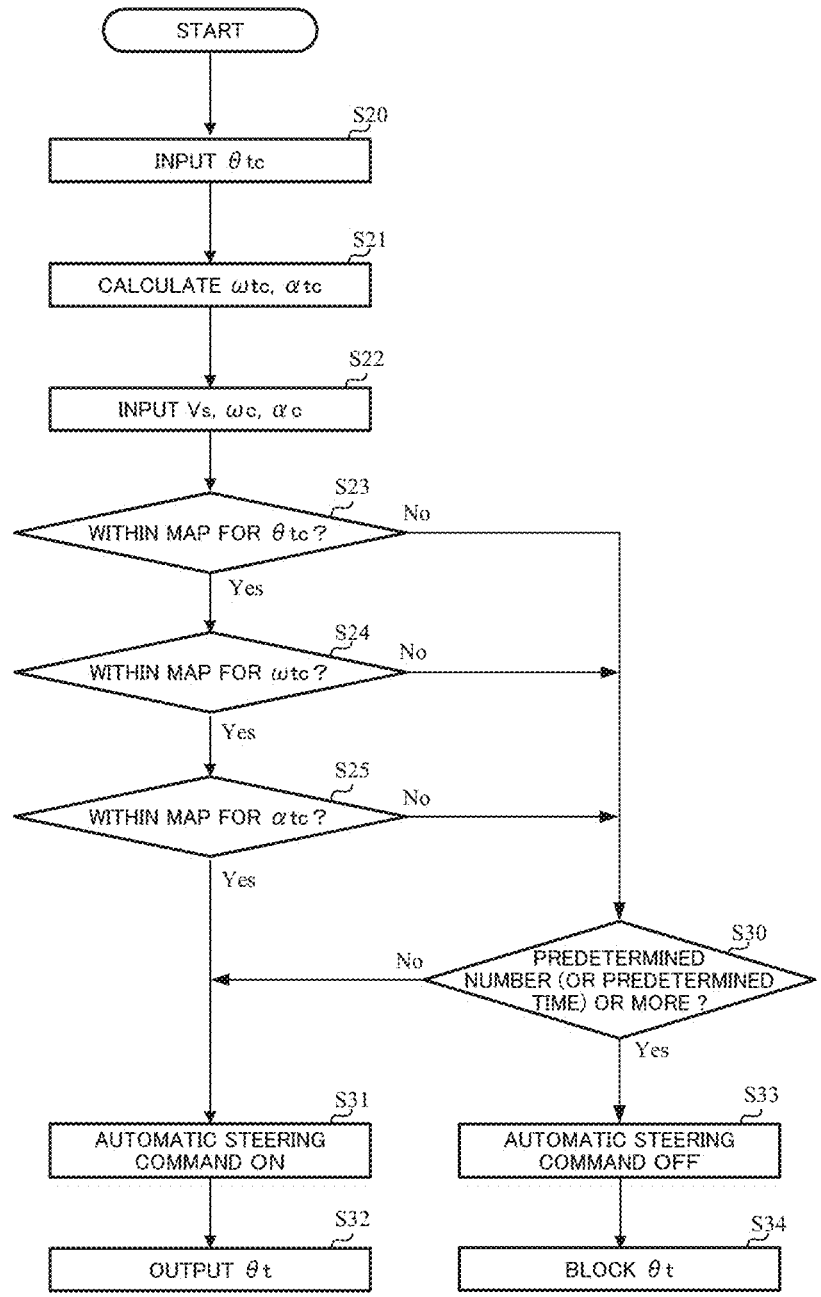
FIG. 15 is a flowchart illustrating a part of exemplary operations of the automatic steering judging section.

Exemplary operations of the automatic steering execution judging section 120 is as shown in the flowchart of FIG. 15.

The calculating section 121 in the automatic steering execution judging section 120 is inputted with the steering angle command value θtc from the CAN or the like (Step S20) and calculates the angular speed ωtc and the angular acceleration αtc based on the steering angle command value θtc (Step S21). The angular speed ωtc and the angular acceleration αtc are inputted into the map judging section 122, and the vehicle speed Vs is also inputted into the map judging section 122 (Step S22). The map judging section 122 first judges whether the steering angle command value θtc corresponding to the vehicle speed Vs is within the range of the characteristic values of the judging map #1 shown in FIG. 12A, that is, whether the steering angle command value θtc is below the characteristic line in FIG. 12A (Step S23). If the steering angle command value θtc is within the range of the characteristic values of the judging map #1, next whether the angular speed ωtc corresponding to the vehicle speed Vs is within the range of the characteristic values of the judging map #2 shown in FIG. 12B, that is, whether the angular speed ωtc is below the characteristic line in FIG. 12B is then judged (Step S24). If the angular speed ωtc is within the range of the characteristic values of the judging map #2, whether the angular acceleration αtc corresponding to the vehicle speed Vs is within the range of the characteristic values of the judging map #3 shown in FIG. 12C, that is, whether the angular speed ωtc is below the characteristic line in FIG. 12C is then judged (Step S25). If all of the judging targets are within the range of the respective characteristic values, the automatic steering execution judging section 120 turns "ON" the automatic steering command (Step S31) and outputs the steering angle command value θtc as the steering angle command value θt for inputting to the steering-angle command value gradual-changing section 100 (Step S32).

Further, when the steering angle command value θtc corresponding to the vehicle speed Vs is not within the range of the characteristic values of the judging map #1 shown in FIG. 12A at the above Step S23, or the angular speed ωtc corresponding to the vehicle speed Vs is not within the range of the characteristic values of the judging map #2 shown in FIG. 12B at the above Step S24, or the angular acceleration αtc corresponding to the vehicle speed Vs is not within the range of the characteristic values of the judging map #3 shown in FIG. 12C at the above Step S25, the diagnosing section 123 compares the number of times when the range is exceeded to a predetermined threshold number of times or compares the length of a time period when the range is exceeded to a predetermined threshold period of time (Step S30). Then, when they do not exceed the thresholds, the operation skips to the above Step S31, where the automatic steering command is switched-"ON". When the number of times or the length of the time period exceeds the thresholds, the automatic steering command is switched-"OFF" (Step S33), and the steering angle command value θt is blocked and is not outputted (Step S34).

As well, the order of the aforementioned Steps S23 to S25 may be changed as appropriate.

Figure 19A:
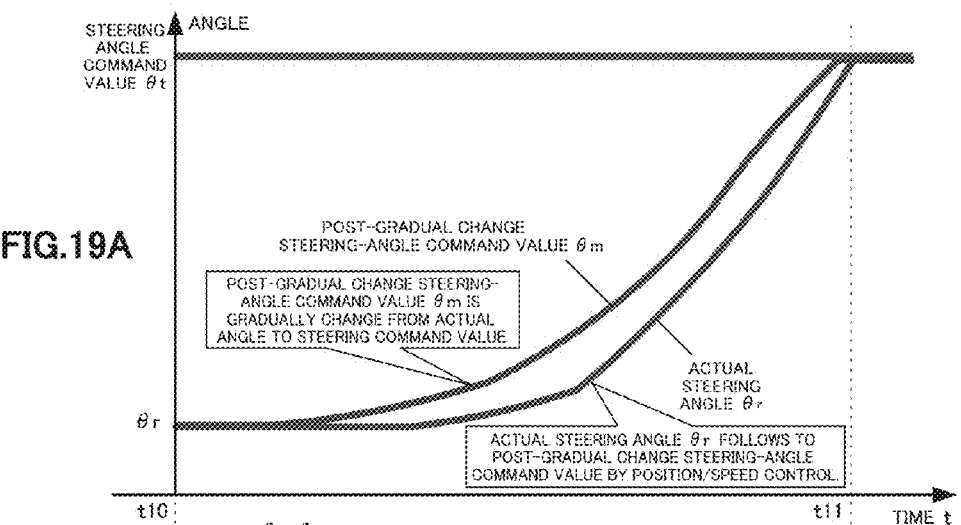
FIGS. 19A and 19B are characteristic diagrams for explaining effects (fade processing) of the present invention.
Figure 19B:
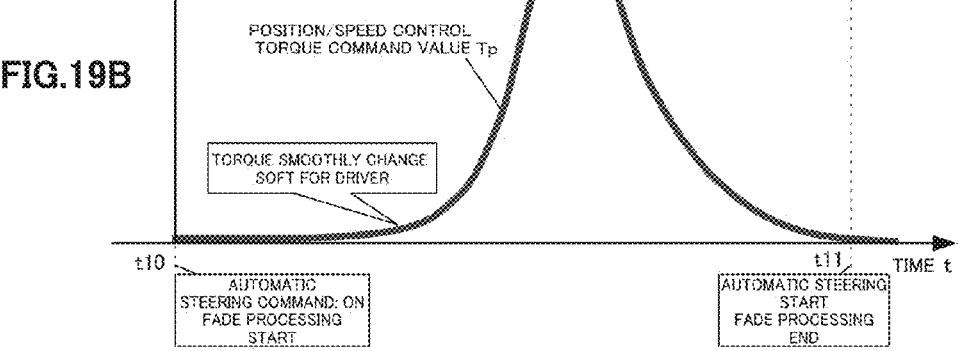

When the automatic steering command is switched-"ON" as shown in FIGS. 19A and 19B (a time point t10), the fade processing is started. The post-gradual change steering-angle command value θm is gradually changed from the actual steering angle θr to the steering angle command value θt. The actual steering angle θr is position/speed-controlled in such a manner as to follow the post-gradual change steering-angle command value θm. Consequently, it is possible to automatically and smoothly change the torque command value of the position/speed control, thereby providing the soft handling feeling to the driver. As well, FIG. 19B shows that a deviation in position is represented as torque.

On the other hand, even when the excessive variations in the steering torque occur after a time point t21 upon the fade processing of the switching from the automatic steering to the torque control (a time point t20) as shown in FIGS. 20A and 20B, the excessive variations in the steering torque is automatically compensated by the position/speed control since the post-gradual change steering-angle command value θm is gradually changed from the steering angle command value θt to the actual steering angle θr. This prevents the driver from losing control of the handle. That is, as shown in FIG. 20A, in the present invention, since the actual steering angle θr is position/speed-controlled in such a manner as to follow the post-gradual change steering-angle command value θm, an occurrence of a peak is delayed and the position/speed control torque command value Tp is generated according to a difference between the post-gradual change steering-angle command value θm and the actual steering angle θr, and then smoothly converges. In the conventional control, however, since the gradual-change starts from a peak of the torque as shown in a broken line in FIG. 20A, the convergence is not smooth. Moreover, a position θr where torque (acceleration) is integrated twice has a trace as in the broken line shown in FIG. 20A and the handle thus moves more.

As described above, the fade gain characteristic is calculated based on the steering torque, and the fade processing (the time and the gain) is changeable in both the fade processing from the torque control to the position/speed control and the fade processing from the position/speed control to the torque control. The above calculation and processing may be performed in at least the fade processing from the position/speed control to the torque control.

Figure 21:
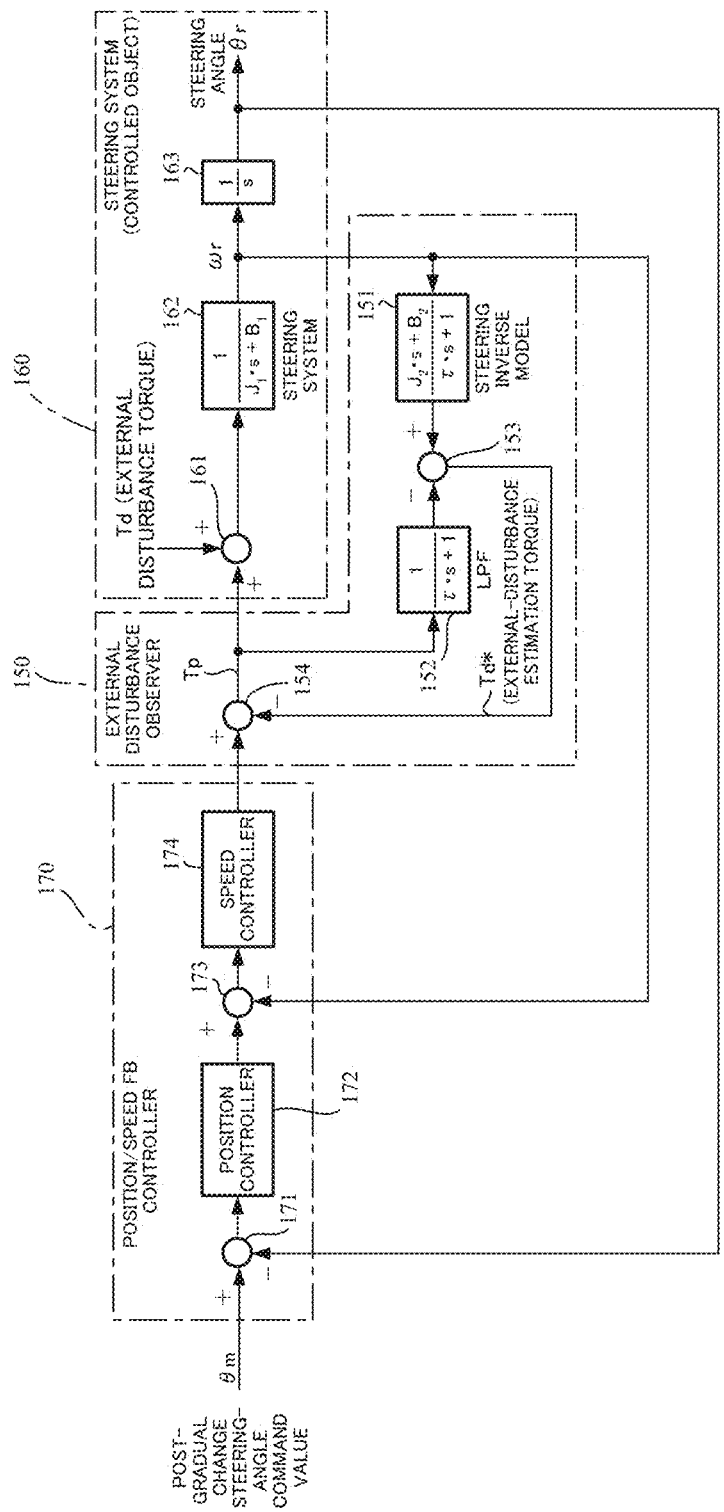
FIG. 21 is a block diagram illustrating an exemplary configuration of an external disturbance observer.

In the present invention as further shown in FIG. 21, an external disturbance observer 150 to compensate inertia or friction of the handle is provided in the position/speed control section 101 so that a handle manual-input of the driver is not prevented. Further, the external disturbance observer 150 also functions as a torque sensor that detects the handle manual-input at a high speed by estimating a torque input by the driver based on the motor current.

The position/speed control section 101 in FIG. 10 comprises a position/speed feedback controller 170 and the external disturbance observer 150 illustrated in FIG. 21. That is, an input of the position/speed control section 101 is the post-gradual change steering-angle command value θm and an output therefrom is the position/speed control torque command value Tp, and state feedback variables are the steering angle θr and the steering angular speed ωr. The position/speed feedback controller 170 comprises a subtracting section 171 to obtain a steering angle deviation between the post-gradual change steering-angle command value θm and the steering angle θr, a position controller 172 to position-control the steering angle deviation, a subtracting section 173 to obtain a speed deviation between the angular speed from the position controller 172 and the steering angular speed ωr, and a speed controller 174 to speed-control the speed deviation. An output from the speed controller 174 is adding-inputted into a subtracting section 154 in the external disturbance observer 150. Further, the external disturbance observer 150 comprises a steering inverse model 151 of a controlled object that is represented by a transfer function "$(J_2 \cdot s + B_2)/(\tau \cdot s + 1)$", a low pass filter (LPF) 152 of a transfer function "$1/(\tau \cdot s + 1)$" that is inputted with the position/speed control torque command value Tp and limits a band thereof, a subtracting section 153 to obtain an external-disturbance estimation torque Td*, and a subtracting section 154 to output the position/speed control torque command value Tp by subtraction.

A steering system 160 subjected to the controlled object comprises an adding section 161 to add an unknown external disturbance torque Td to the position/speed control torque command value Tp, a steering system 162 represented by a transfer function "$1/(J_1 \cdot s + B_1)$", and an integral section 163 to integrate (1/s) the angular speed ωr from the steering system 162 and to output the steering angle θr. The steering angular speed ωr is fed back to the position/speed feedback controller 170 and is also inputted into the integral section 163. The steering angle θr is fed back to the position/speed feedback controller 170.

The symbol "$J_1$" in the transfer function represents the inertia in the steering system 162, "$B_1$" represents the friction in the steering system 162, "$J_2$" represents the inertia in the steering inverse model 151, "$B_2$" represents the friction in the steering inverse model 151, and "τ" represents a predetermined time constant. These have relationships represented by the following Equations 7 and 8.

$$J_1 \geq J_2 \qquad [\text{Equation 7}]$$

$$B_1 \geq B_2 \qquad [\text{Equation 8}]$$

The external disturbance observer 150 estimates the unknown external disturbance torque Td base on a difference between outputs of the steering inverse model 151 and the LPF 152 and obtains the external-disturbance estimation torque Td* as an estimation value. The external-disturbance estimation torque Td* is subtracting-inputted into the subtracting section 154, and it is possible to realize a robust position/speed control by subtracting the external-disturbance estimation torque Td* from an output of the speed controller 174. However, the robust position/speed control results in contradiction that the handle cannot be stopped even with intervention by the driver. In order to improve this point, the inertia $J_2$ and the friction $B_2$ smaller than or equal to the inertia $J_1$ and the friction $B_1$, respectively, which the steering system 162 actually has, are inputted as the steering inverse model 151. As a result of this, the inertia and the friction of the handle that the driver feels becomes seemingly smaller. This allows the driver to easily intervene in the automatic steering by steering.

Moreover, by monitoring the external-disturbance estimation torque Td* in the external disturbance observer 150, it is possible to detect the steering torque of the driver instead of the torque sensor. Especially, when the torque sensor uses digital signals, detection of steering intervention by the driver may be delayed due to influence of communication delay or other reasons. Similarly to the torque sensor, when the external-disturbance estimation torque Td* exceeds a threshold value for a predetermined period of time, the steering intervention may be determined to be performed and the fade processing may be performed.

Figure 22A:
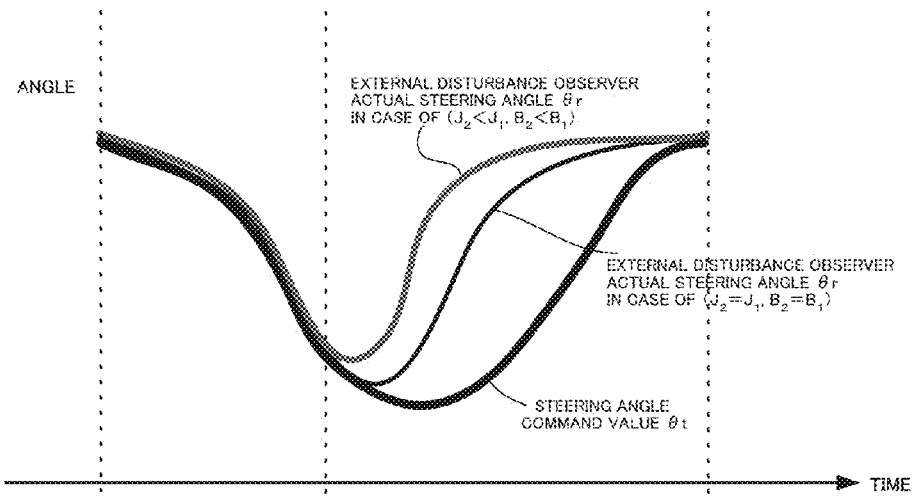
FIGS. 22A and 22B are characteristic diagrams illustrating exemplary effects of providing the external disturbance observer.
Figure 22B:
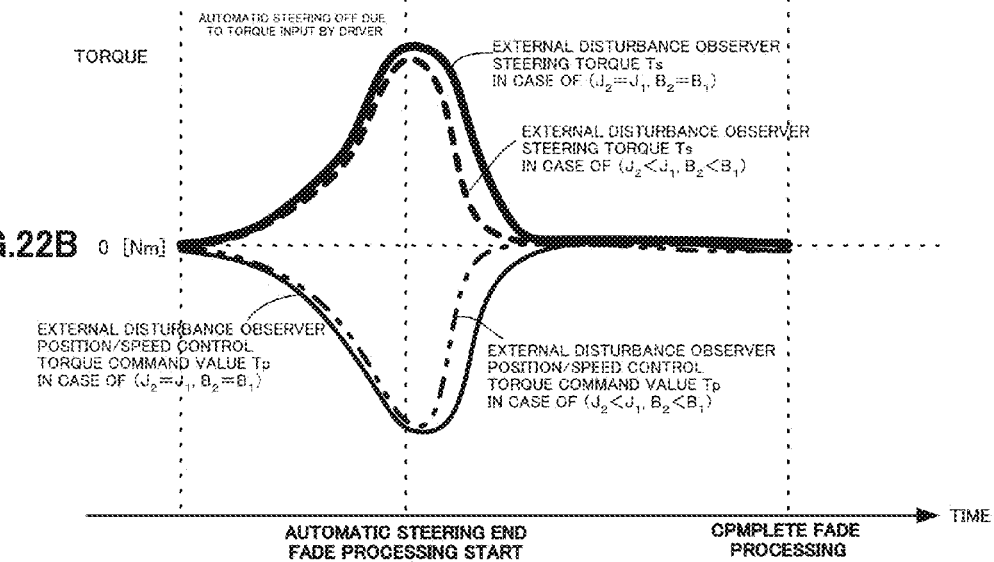

FIGS. 22A and 22B are diagrams illustrating characteristics of the angle and the torque, respectively, in the fade processing from the position/speed control to the torque control when the external disturbance observer 150 is provided. The driver turns the handle in an opposite direction to a direction of the steering angle command value θt in the automatic operation and releases the handle when the automatic steering is turned "OFF" (the fade processing is started). In FIGS. 22A and 22B, the characteristics of the external disturbance observer 150 in a case where the inertia and the friction satisfy "$J_1 > J_2$" and "$B_1 > B_2$" and a case where "$J_1=J_2$" and "$B_1=B_2$" are satisfied are illustrated. FIG. 22A is a diagram illustrating exemplary variations in the actual steering angle θr when the external disturbance observer 150 is provided. FIG. 22B is a diagram illustrating exemplary variations in the steering torque Ts and the position/speed control torque command value Tp when the external disturbance observer 150 is provided.

Providing the external disturbance observer 150 allows for providing a smoother operation feeling, thereby enabling switching control at a highspeed. Smaller inertia and friction facilitate the steering intervention.

EXPLANATION OF REFERENCE NUMERALS

1 handle (steering wheel)
2 column shaft (steering shaft, handle shaft)
10 torque sensor
12 vehicle speed sensor
20, 131 motor
31 control unit (ECU)
40 CAN
41 Non-CAN
50 automatic steering command unit
51, 101 position/speed control section
52, 120 automatic steering execution judging section
53 torque control section
54 torque command value gradual-change switching section
100 steering-angel command value gradual-changing section
102 torque control section
103 torque gradual-changing section
105 steering-angle speed gradual-changing section
130 current control system
140 characteristic calculating section
150 external disturbance observer

The invention claimed is:

1. An electric power steering apparatus including a torque sensor to detect a steering torque and a motor control unit to control a motor that applies an assist torque to a steering system of a vehicle, comprising:
  a function to switch a control system of said motor between a torque control system of a torque system to control a motor output torque and a position or speed control system of a steering angle system to control a steering angle of a steering in accordance with a predetermined switching trigger,
  wherein each of a steering angle command value and a steering angle speed of said position or speed control system and an assist torque level of said torque control system gradually change sensitive to said steering torque, when shifting from said torque control system to said position or speed control system.

2. The electric power steering apparatus according to claim 1, further comprising a characteristic calculating section to calculate a fade gain signal F1 that applies a fade characteristic 1 of said torque system, a fade gain signal F2 that applies a fade characteristic 2 of said steering angle system, and a fade gain signal F3 that applies a fade characteristic 3 of said steering angle speed, sensitive to said steering torque, when said predetermined switching trigger is switched-ON/OFF.

3. The electric power steering apparatus according to claim 2, wherein,
  when said predetermined switching trigger is switched-ON,
  a post-gradual change steering-angle command value in a position or speed control is gradually changed from an actual steering angle to a steering angle command value by said fade gain signal F2,
  a level of said assist torque in a torque control is gradually changed from 100% to 0% by said fade gain signal F1, and
  said steering angle speed is gradually changed from 0% to 100% by said fade gain signal F3, and then said position or speed control system is operated.

4. The electric power steering apparatus according to claim 2, wherein,
  when said predetermined switching trigger is switched-OFF,
  a post-gradual change steering-angle command value in a position or speed control is gradually changed from a steering angle command value to an actual steering angle by said fade gain signal F2,
  a level of said assist torque in a torque control is gradually changed from 0% to 100% by said fade gain signal F1,
  said steering angle speed is gradually changed from 100% to 0% by said fade gain signal F3, and then said torque control system is operated.

5. The electric power steering apparatus according to claim 3, wherein,
  by respectively setting a past value $FG(Z^{-1})$ of a fade gain, an exponential gain A and a fade rate FR, said fade gain signals F1, F2 and F3 are calculated by a form of "$A \times FG(Z^{-1})+FR$".

6. The electric power steering apparatus according to claim 4, wherein,
  by respectively setting a past value $FG(Z^{-1})$ of a fade gain, an exponential gain A and a fade rate FR, said fade gain signals F1, F2 and F3 are calculated by a form of "$A \times FG(Z^{-1})+FR$".

7. The electric power steering apparatus according to claim 1, wherein said predetermined switching trigger is performed by an automatic steering execution judging section.

8. The electric power steering apparatus according to claim 7,
  wherein said automatic steering execution judging section comprises:
  a calculating section to calculate an angular speed and an angular acceleration by inputting a steering angle command value;
  a map judging section to judge each of said steering angle command value, said angular speed and said angular acceleration with a judging map corresponding to a vehicle speed; and
  a diagnosing section to diagnose based on a judgement result from said map judging section.

9. The electric power steering apparatus according to claim 1, further comprising an external disturbance observer to compensate inertia and friction of a handle.

10. The electric power steering apparatus according to claim 9, wherein said external disturbance observer estimates an external-disturbance estimation torque from a difference between an output of a steering inverse model of said steering system and an output of a low pass filter (LPF) to limit a band.

11. The electric power steering apparatus according to claim 10, wherein values of inertia and friction of said steering system are greater than or equal to values of inertia and friction of said steering inverse model, respectively.

12. An electric power steering apparatus including a torque sensor to detect a steering torque and a motor control unit to control a motor that applies an assist torque to a steering system of a vehicle, comprising:

a function to switch a control system of said motor between a torque control system of a torque system to control a motor output torque and a position or speed control system of a steering angle system to control a steering angle of a steering in accordance with a predetermined switching trigger, wherein each of a steering angle command value and a steering angle speed of said position or speed control system and an assist torque level of said torque control system gradually change sensitive to said steering torque, when shifting from said position or speed control system to said torque control system.

13. The electric power steering apparatus according to claim 12, further comprising a characteristic calculating section to calculate a fade gain signal F1 that applies a fade characteristic 1 of said torque system, a fade gain signal F2 that applies a fade characteristic 2 of said steering angle system, and a fade gain signal F3 that applies a fade characteristic 3 of said steering angle speed, sensitive to said steering torque, when said predetermined switching trigger is switched-ON/OFF.

14. The electric power steering apparatus according to claim 13, wherein, when said predetermined switching trigger is switched-ON, a post-gradual change steering-angle command value in a position or speed control is gradually changed from an actual steering angle to a steering angle command value by said fade gain signal F2, a level of said assist torque in a torque control is gradually changed from 100% to 0% by said fade gain signal F1, and said steering angle speed is gradually changed from 0% to 100% by said fade gain signal F3, and then said position or speed control system is operated.

15. The electric power steering apparatus according to claim 13, wherein, when said predetermined switching trigger is switched-OFF, a post-gradual change steering-angle command value in a position or speed control is gradually changed from a steering angle command value to an actual steering angle by said fade gain signal F2, a level of said assist torque in a torque control is gradually changed from 0% to 100% by said fade gain signal F1, said steering angle speed is gradually changed from 100% to 0% by said fade gain signal F3, and then said torque control system is operated.

16. The electric power steering apparatus according to claim 14, wherein, by respectively setting a past value $FG(Z^{-1})$ of a fade gain, an exponential gain A and a fade rate FR, said fade gain signals F1, F2 and F3 are calculated by a form of "$A \times FG(Z^{-1})+FR$".

17. The electric power steering apparatus according to claim 15, wherein, by respectively setting a past value $FG(Z^{-1})$ of a fade gain, an exponential gain A and a fade rate FR, said fade gain signals F1, F2 and F3 are calculated by a form of "$A \times FG(Z^{-1})+FR$".

18. The electric power steering apparatus according to claim 12, wherein said predetermined switching trigger is performed by an automatic steering execution judging section.

19. The electric power steering apparatus according to claim 18, wherein said automatic steering execution judging section comprises:

a calculating section to calculate an angular speed and an angular acceleration by inputting a steering angle command value;

a map judging section to judge each of said steering angle command value, said angular speed and said angular acceleration with a judging map corresponding to a vehicle speed; and a diagnosing section to diagnose based on a judgement result from said map judging section.

20. The electric power steering apparatus according to claim 12, further comprising an external disturbance observer to compensate inertia and friction of a handle.

21. The electric power steering apparatus according to claim 20, wherein said external disturbance observer estimates an external-disturbance estimation torque from a difference between an output of a steering inverse model of said steering system and an output of a low pass filter (LPF) to limit a band.

22. The electric power steering apparatus according to claim 21, wherein values of inertia and friction of said steering system are greater than or equal to values of inertia and friction of said steering inverse model, respectively.

* * * * *